US008285879B2

(12) United States Patent
Cheifot et al.

(10) Patent No.: US 8,285,879 B2
(45) Date of Patent: Oct. 9, 2012

(54) COMMUNICATIONS SYSTEM RECOVERY SYSTEM

(75) Inventors: Alexandre Cheifot, Delta (CA); Keith Richard Martin, Burnaby (CA); Peter Randolph Aeberhardt, North Vancouver (CA)

(73) Assignee: Tantalus Systems Corp., Burnaby (CA)

( * ) Notice: Subject to any disclaimer, the term of this patent is extended or adjusted under 35 U.S.C. 154(b) by 2 days.

(21) Appl. No.: 12/805,596

(22) Filed: Aug. 9, 2010

(65) Prior Publication Data

US 2011/0010439 A1    Jan. 13, 2011

Related U.S. Application Data

(62) Division of application No. 10/763,918, filed on Jan. 26, 2004, now Pat. No. 7,802,015.

(51) Int. Cl.
*G06F 15/16* (2006.01)

(52) U.S. Cl. ............ 709/248; 713/400; 714/4.1
(58) Field of Classification Search ............... 709/248; 713/400; 714/4.1
See application file for complete search history.

(56) References Cited

U.S. PATENT DOCUMENTS

| 5,790,805 | A  | * | 8/1998  | Bantum       | 709/248 |
| 5,907,685 | A  | * | 5/1999  | Douceur      | 709/248 |
| 6,199,169 | B1 | * | 3/2001  | Voth         | 713/400 |
| 6,345,281 | B1 | * | 2/2002  | Kardos et al.| 700/100 |
| 2002/0174372 | A1 | * | 11/2002 | Venkataraman | 713/400 |
| 2004/0078655 | A1 | * | 4/2004  | Sung         | 714/14  |

* cited by examiner

*Primary Examiner* — Thomas Dailey

(57) ABSTRACT

A communications system for a network of stations, is provided where stations identify themselves upon being informed of the desires of an inquisitor station. Additionally, techniques for "plug and play", self-healing and homogenizing the heterogeneous parts of a network, are provided.

4 Claims, 4 Drawing Sheets

| PREAMBLE | SOURCE/DESTINATION | PAYLOAD | ERROR CORRECTION |

FIG. 1

| PREAMBLE | CONTEXTUAL FUNCTION | PAYLOAD | ERROR CORRECTION |

FIG. 2

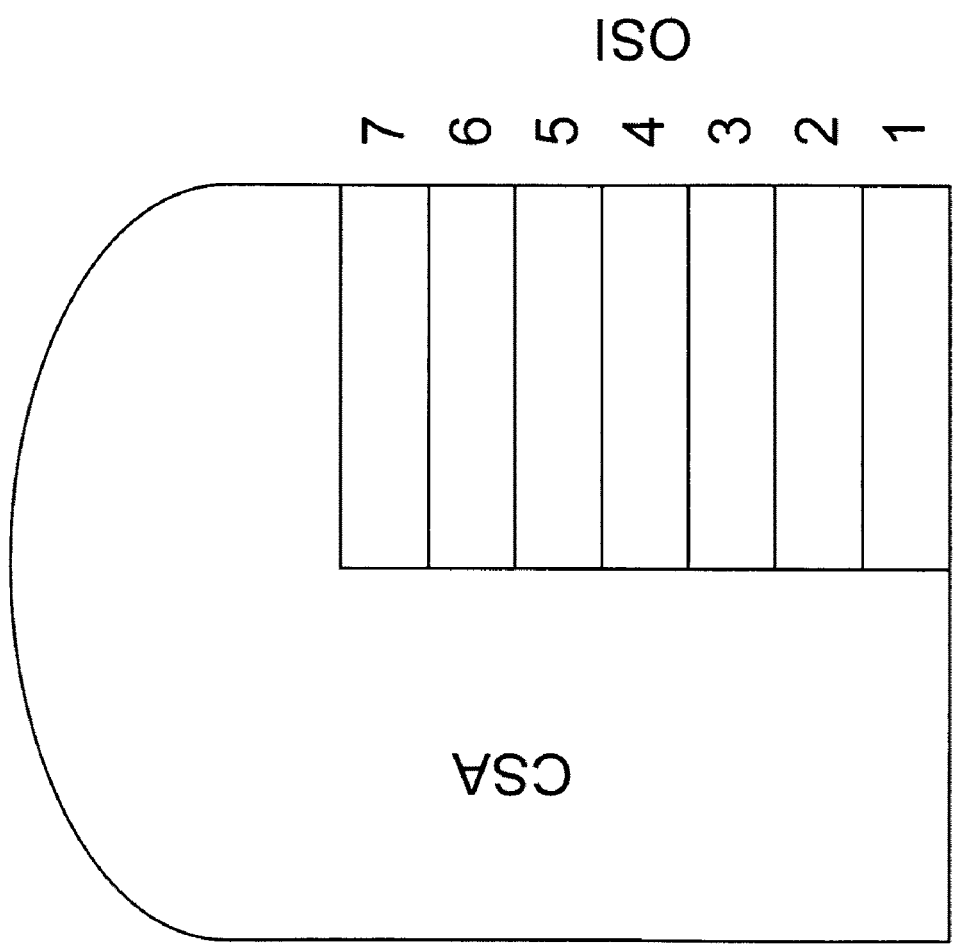

COMMUNICATIONS SYSTEM RECOVERY SYSTEM

CROSS-REFERENCE TO RELATED APPLICATION

This application is a divisional of, and incorporates herein by reference in its entirety, U.S. patent application Ser. No. 10/763,918, which was filed on Jan. 26, 2004 now U.S. Pat. No. 7,802,015.

NOTICE REGARDING COPYRIGHTED MATERIAL

A portion of the disclosure of this patent document contains material which is subject to copyright protection. The copyright owner has no objection to the facsimile reproduction of the patent document or the patent disclosure as it appears in the Patent and Trademark Office file or records, but otherwise reserves all copyright rights whatsoever.

FIELD OF THE INVENTION

This invention relates to communications systems for telemetry and related applications.

BACKGROUND OF THE INVENTION

For a message sender in a network, methods of identifying and addressing that operate in a context-devoid vacuum, have limitations. A method of identifying and addressing that relies solely on "where" something is (physically or logically), whether by itself or relatively (in logical or physical relation to others), is limited. A conventional addressing scheme wherein network elements are addressed only by "where" they are, requires the sender to decide which network elements it wishes to contact and to know their locations, all before sending a message thereto. Having to know "where" to send a message to, is inefficient, especially if the sender does not know what is happening "out there" on a real time basis in the operating environment and must first spend time and effort to find out before sending the message.

Furthermore, an addressing scheme that assigns (even temporarily) to a network element, a uni-dimensional address for only one context, is anemic. A network where a network element is assigned a fixed address (e.g. MAC address or even a temporarily static IP address under TCP/IP's Dynamic Host Configuration Protocol or DHCP) and has no other address or means by which it can be addressed, has limitations. Static schemes imply a frozen set of addressable elements, which in turn implies that the communications system is not changing over time and is unresponsive to the operating environment that typically is changing.

Accordingly, conventional addressing schemes betoken, at best, a first order, rough approximation of a communications system interacting with its operating environment.

A realistic communications system is dynamic. It changes or is changeable over time, often in response to stimuli (typically but not exclusively, from the operating environment), and sometimes needs to change itself (e.g. periodically or event-driven maintenance or repair). Accordingly, the more variables (and resulting dimensions) of a network element that are available for the sender to consider in identifying pertinent elements (and not just "where" an element is), the "richer" the potential identities, and the "richer" the entire communications network, become. With that enrichment comes attendant efficiencies for desired complex actions (in terms of speed, granularity, specificity, for examples) on the operating environment.

SUMMARY OF THE INVENTION

There is provided, for a network of stations having a Base Station, wherein each station sends messages to the Base Station and the sending of a message requires power, and each station is provided with power and each station has a clock and persistent memory and wherein the Base Station maintains a network time for the network stations to coordinate with, a method of recovering the state of the network stations upon the occurrence of a disturbance of that power and a resumption after the power disturbance, comprising the steps of: each station, while powered, (a) keeps in said memory, a copy of each message after said message is sent; (b) indicates on said message copy the status as said message is being sent; (c) stores time-stamps, based on each station's clock, with each said message copy indicating a time of sending; (d) upon the occurrence of the power disturbance and then the power resumption, sending to the Base Station, each said time-stamped message copies; and the Base Station re-assembling the messages in chronological order based on said message copies; and wherein said clock re-starts at the time said clock had upon the power disturbance and continues until said clock is able to be coordinated with the network time.

BRIEF DESCRIPTION OF THE DRAWINGS

An understanding of this invention can be obtained when the description of the preferred embodiment is considered in conjunction with the following drawings, where:

FIG. 1 is an idealized Traditional Message format;

FIG. 2 is an idealized Contextual Addressing Scheme message format;

FIG. 4 is an illustration of the Contextual Addressing Scheme juxtaposed against the OSI;

DETAILED DESCRIPTION OF THE PREFERRED EMBODIMENT

Figure 3:
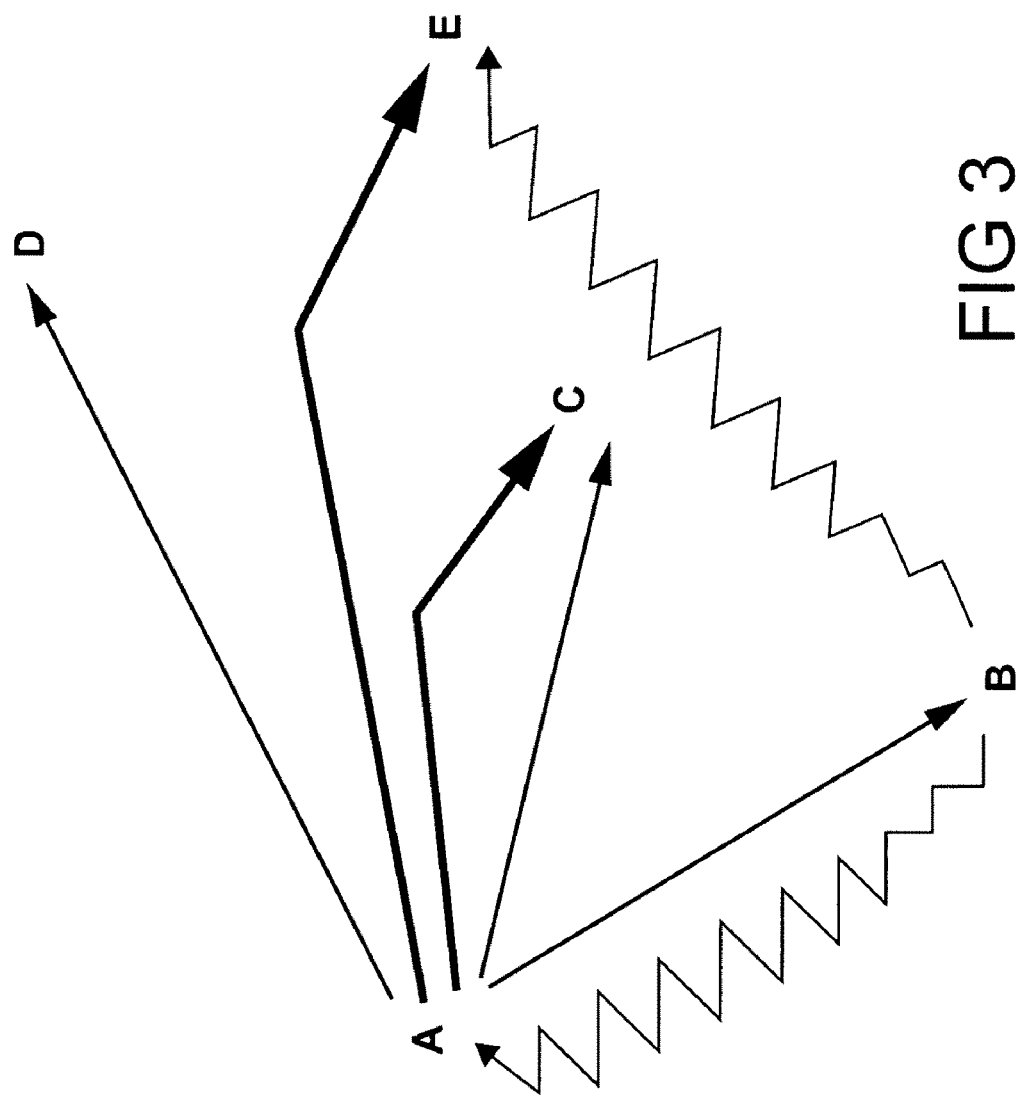
FIG. 3 is an illustration of several Contextual Addressing Scheme networks.

Before explaining the preferred embodiment (of wireless electric utility telemetry), some terminological guides and definitions are introduced for ease and economy of expression and understanding, an overview is sketched wherein the role of addressing schemes is indicated, conceptual introductions are made to usher in inventive concepts, all with allusions to aspects of the preferred embodiment.

The term "examplary" herein refers to the provision of an example for illustrative purposes (as in, "For example, . . . ") and does not connote any notions of being "best" in any absolute sense as might be connoted by the term "exemplary" because what is "best" depends on a particular context.

Analogies from non-information technologies (personal, company, societal and bio-medical, for examples) are suggested herein only to facilitate insight into inventive concepts, and are not to be pressed too far for a precise congruence to the inventions.

As a first analogy, the medical researcher asks, "How (well) does the human body interact with its environment? If the mind develops the desire, "If the temperature gets too hot, flee now!", how (well) does it perform to realize that desire? How can the mind best engage the senses and limbs to interact with the environment?"

For this invention, at the level of embodiments (preferred or otherwise), an analogous example might have the utility ask, "How (well) is the following desire performed, "If the power grid is now drawing too much power, then immediately shut down certain stations!"? How can that desire be better achieved?"

At a high level of conception, a super-system or a complex has: (I) a command and control system (which includes a communications sub-system), that engages (II) interacting equipment that interacting with the operating environment.

The operating environment is the dynamic matrix or combination of physical conditions in which the super-system or complex operates; and for the preferred embodiment, it is, the electric power grid operating in real time.

A unit of interacting equipment (an "Interaction Module" in the preferred embodiment) has and interacts with the operating environment through: (1) a sensor (that converts a physical property of the operating environment into electric signals usable by upstream intelligence) or (2) an effector (that converts electrical signals from upstream intelligence, to a corresponding physical action on the operating environment, i.e. that affects the operating environment). In the preferred embodiment, a typical sensor-Interaction Module is the combination of a conventional watthour meter (e.g. General Electric I70S1) coupled with a conventional electro-mechanical-optical-electrical converter (e.g. U.S. Pat. No. 5,874,732 and the art referred to therein or the commercially available Itron 40ER-1). That combination provides electric signals indicative of electricity consumption on the metered power line. In the preferred embodiment, a typical effector-Interaction Module is a remote disconnect switch that, on command, terminates the electricity in the power line it is attached to.

For economy of expression herein, the terms (and content of) "command and control system" and "communications sub-system", are collapsed and called collectively "communications system", with little loss of content appreciable for this invention. The communications system has (1) a communications network having (in the preferred embodiment) (a) a central intelligence, (b) a plurality of remote endpoints, and (c) communication channels therebetween, and (2) an addressing scheme whereby messages are addressed within the network. Through the endpoints, the communications system engages the Interface Modules that interact with the operating environment. The endpoints thus represent (to the central intelligence) the "end" of communication paths.

Rephrasing the preceding, a super-system or a complex has (with preferred embodiment implementations <parenthetically introduced>): (I) a communications system having (1) a communications network having (a) a central intelligence <(Base Station>, (b) a plurality of remote endpoints <LAN Devices> and (c) communication channels therebetween <communication proxies including WAN and LAN Devices>, and (2) an addressing scheme <Traditional and Contextual Addressing> whereby messages are addressed within the network, wherein each endpoint engages (II) its interacting equipment <Interaction Module> that interacts with the operating environment. Base Station, WAN and LAN Devices are collectively the communications network devices or "Network Devices".

In its generality, a communication channel includes all communications infrastructure and means required to send/receive a message, exclusive of, but according to, the applicable addressing scheme. In preferred embodiment implementation, a channel includes hardware/software/firmware such as transmitters, receivers, encoders/decoders and the like, and communications protocols, that are necessary for the communications method employed, exclusive of the addressing scheme. One part of communications channel in the preferred embodiment is a "communication proxy", which herein is any functionality that serves to "lengthen" the communications path for a message without altering its substantive content. A transparent proxy is typically a repeater (something that boosts or amplifies the signal or, in the case of a digital signal, regenerates the signal, all to reduce errors due to decay over distance). A non-transparent proxy provides some extra services (e.g. packetizing, a bridge or router for packetized messages, caching, protocol conversion) but still retains the basic function of "lengthening" the communications path (e.g. by converting the message with a protocol that is more robust for the (e.g. RF noisy) operating environment without altering the substantive content of the message). Herein, the term "communication proxy" includes transparent and non-transparent types. In the preferred embodiment, a WAN Device is an examplary communication proxy between the Base Station and the network endpoints. Also, a LAN Device is an examplary communication proxy between a WAN Device and network endpoints.

In the preferred embodiment, a LAN Device is an examplary endpoint of the communications network. It is the LAN Device that engages the (sensor/effector) Interaction Module. The communications system engages sensors and effectors but does not include them (in the same way that the nervous system of the human body, is not, in common vernacular, considered to include eyes and hands).

The term "desired complex action" herein is the desired action of the super-system or complex to be achieved by the (collective or cumulative) effect of the communications system acting through its endpoints (LAN Devices), each endpoint (LAN Device) engaging (in concert or individually) its (sensor/effector) Interaction Module that interacts with the operating environment. A principle objective of this invention is for the Base Station to achieve a desired complex action through effective engagements of the Interaction Modules for interacting with the operating environment.

Desired complex actions obviously depend on business objectives, operating environment, marketplace realties, etc. Examplary desired complex actions for an electric utility for the preferred embodiment, relate to power outage management, Power Quality Measurement, load management and distribution automation.

Effective engagements (of the Interaction Modules for interacting with the operating environment) are achieved through inventive use of the communications network and inventive addressing. Explained herein are two types of network addressing schemes: a conventional (upstream and downstream) Traditional Addressing Scheme or TAS, and, in contrast thereto, a new, downstream addressing scheme based on "context", the Contextual Addressing Scheme or CAS. In particular, the CAS assists in "seeking" the endpoints and their Interaction Modules that are relevant to the desired complex action. Also explained herein are new processes employing these two addressing schemes. The TAS (and processes based thereon), and the CAS (and processes based thereon) can each stand alone. But according to the preferred embodiment, a network advantageously uses both the TAS and CAS.

As a matter of terminology, a complex action is "desired" (by the central intelligence, Base Station), and the expression and achievement of that desire are carried out through effective engagements of the Interaction Modules interacting with the operating environment. Accordingly, (1) Interaction Modules and (2) their respective endpoints (LAN Devices in the preferred embodiment) including endpoint components and related CAS concepts of identity and Contextual Address, are all "sought" as being relevant to a desired complex action, and are synonymous for the aforesaid purpose of "seeking"—all carry the epithet "sought".

In a network of Base Station and remote elements (whether they are endpoints or intermediate points such as communication proxies, and whether they are configured as a LAN, WAN, hybrid WAN/LAN), a direction towards the Base Station or an intermediate element therebefore, is "upstream", and the opposite direction is "downstream". These terms of orientation (upstream and downstream) apply to: (1) the intended direction of a message (and any component or implementation thereof, e.g. packet) and (2) the location of a network element (e.g. other Station or Device in the preferred embodiment) in particular, and of intelligence generally (no matter how distributed), relative to a particular network element (Station or Device).

Aspects, components, concepts and the like, that derive from the Contextual Addressing Scheme (or CAS) and from the Traditional Addressing Scheme (or TAS), are herein termed formatively therefrom (e.g. TAS message, Traditionally Addressed message, Traditional Address, TAS network, TAS Station, CAS message, Contextually Addressed message, Contextual Address, CAS network, CAS Station, etc.).

A CAS network is the subset of the communications network whose elements are addressed using the CAS, in which a CAS Inquisitor Station sends a CAS message to all CAS Inquisitee Stations (as such terms are explained below, although in the preferred embodiment, the CAS Inquisitor Station is always the Base Station); and a TAS network is the subset of the communications network whose elements are addressed using a TAS in which a source TAS Station sends a TAS message to destination TAS Station(s).

In contrast to the operating environment of the super-system or complex, the term, "network environment" refers to the relations of a CAS Station with other CAS Stations of the same CAS network, or of a TAS Station with other TAS Stations of the TAS network, as the case may be.

The TAS is the "default" (upstream and downstream) addressing scheme in the preferred embodiment (and is used in many processes like Plug & Play, AMR and PQM reporting and others explained below). The exception is those downstream messages from the Base Station that are Contextually Addressed.

The OSI is a theoretical reference model (and not a definition of a standard) for analyzing communications within a network. When explaining TAS or CAS, references to one or several layers of OSI are useful only for economy of explanatory expression and are made at the expense of loss of accuracy of explanation because the CAS does not map onto the OSI reference model in the conventional use of that model.

In the preferred embodiment, all (downstream and upstream) messages (whether Traditionally Addressed or Contextually Addressed) are packetized, although for ease of explanation herein, a message herein is of a length that generally takes the form of one packet in the idealized formats of FIGS. 1-2. It is important not to restrict any connotation or denotation of the term "packet" herein to the OSI transport layer 4. Dividing a message into smaller units, and related processes, are the result of design and implementation choices favoring certain aspects of network performance over other aspects, for a particular network implementation. The choice of the term "packet" herein refers to a unit that differs from the term "message" only in its conceptual level (where "packet" refers to an implementation of a "message", i.e. at a lower OSI layer than the one where the message is implemented). In other words, a "packet" and a "message" are often used interchangeably except where an implementation distinction is usefully highlighted. Where the payload, for example, is large, obvious implementation modifications are necessary (e.g. the message would be packetized into several packets).

In the preferred embodiment, the reception of all (downstream and upstream) Traditionally Addressed messages by the (immediate or ultimate) destination station, is acknowledged on a packet by packet basis to the source station, by any suitable conventional methodology not explained herein for economy of expression. When an acknowledgement is not received for a packet (for example, after a preset number of failed retries or perhaps when a "negative acknowledgement" is received indicative of a failure in the integrity of the packet received), the source station considers that message to be lost (and proceeds to handle according to "Lost Messages" explained below).

Traditional Addressing Scheme (or TAS)

Traditional Addressing Schemes assigns each station a unique address that is also static. Traditionally, an address is assigned to a station by the network controller/administrator according to a preconceived addressing plan and is retained by the station until changed by the network controller/administrator; or is assigned when a station joins the network (according to a protocol-specific process for that network) and is retained while joined. That address is used by the TAS source station to send a TAS message to the intended TAS destination station. In a TAS network, a TAS Station is addressable by its TAS address and therefore cannot, by definition, have a "null" TAS address. Furthermore, because in a TAS, the address of a station corresponds, directly or indirectly, to a physical location, a TAS address must be unique (since two different locations in space cannot be identified by a single identifier).

The TAS network (and in particular, whether a central intelligence or distributed intelligence) knows the address(es)—the "where(s)", by analogy—of the destination station(s) it wants to send to and uses that "where"-knowledge to so send. In particular, in a TAS network of a Base Station addressing addressable stations, the Base Station (or its communication proxies, like bridges, routers and the like, depending on implementation) knows and uses the addresses of all addressable stations, to send messages thereto (where its knowledge of those addresses, exists at least when it sends the messages thereto, and is typically maintained in a central database or distributed tables). This "knows and uses" aspect of a Traditional Addressing Scheme, is to be contrasted with the agnosticism of the Contextual Addressing Scheme explained below, which does "not know" (and does "not use" and does not "not care" how the message is actually sent and arrives).

Common examplary TAS networks include: a network whose elements each have a MAC address (having a hierarchical format of <manufacturer><serial #>), whether the network is wired or operates under a wireless protocol like IEEE 802.11; a wired network wherein an element address is implicitly equivalent to the physical location of the element; and a network operating on a hierarchical addressing scheme, common examples of which are IP address's dotted decimal classes. Another TAS network example (explained below as part of the preferred embodiment) assigns a unique Network ID to each Network (LAN and WAN) Device.

It is important to observe that what appears to be a "dynamic" addressing scheme, is in reality, for the purposes of this invention, a static, Traditional Addressing Scheme. For example, the TCP/IP's DHCP is only superficially dynamic and is really a static TAS. The DHCP allows a server or like service, to assign IP addresses dynamically in real time to particular network interfaces. DHCP supports manual, automatic and/or dynamic address assignment, to temporarily assign or "lease" an IP address to a network interface for a particular period of time, and to reclaim it later for reassignment at the expiration of the "lease". But once an IP address is "leased" by DHCP to a network interface (however temporarily), that network interface is identified statically by that IP address and its address is equivalent to its "logical" location (i.e. its "where" is its topological position in the IP hierarchical addressing scheme) and that location will not change for the duration of the "lease" or "session". It is thus seen that DHCP is no more than one way of establishing a Traditional Addressing Scheme for certain periods of time.

A point-to-point Traditionally Addressed message may take the conventional, generic and idealized packet format of FIG. 1. To the ADDRESS (SOURCE/DESTINATION) and PAYLOAD fields, the format conventionally prepends and appends management control information (e.g. packet sequence #, packet type, priority, error detection/correction codes, seeds for encryption processes, delimiters, and other conventional design choices), which, for economy of expression, is labelled simply as PREAMBLE and ERROR CORRECTION.

The Traditionally Addressed message format of FIG. 1 may efficiently have an upstream/downstream flag (not shown) so that for an upstream message, only the address of the source station of the message is provided in the ADDRESS field; and conversely, for a downstream message, only the address of the destination station is provided in the ADDRESS field. In the TAS network of the preferred embodiment, the aforementioned source address and the destination address are, respectively, the Network ID of the source Network Device and the Network ID of the destination Network Device.

Contextual Addressing Scheme (CAS)

Some introductory, non-technical observations are useful before explaining the CAS itself.

Identity is not monolithic and it does not exist in a vacuum. Identity is a fluid creature of context—it depends on both the person who wants to know (in particular, depends on his viewpoint or what he is interested in) and the person(s) being asked (in particular, depends on their personal attributes). The questions, "who are you?" or "who am I?", make sense (i.e. can be answered meaningfully) only in context. For example, an individual can be both "the lady of the house" (the chatelaine) or "Credit Department manager" but her identity depends on context—whether she is at home or at work and whether the person asking is a travelling salesman whose interest is to sell a vacuum cleaner at the lady's home or is a department store customer whose interest is to increase his credit limit. Similarly, in a family setting, an individual can have multiple identities of father, husband, son, or some combination thereof, all depending on context. Even as some business advertising jingos proclaim, "you are not just a policy number to us . . . ".

One important aspect of context (and thereby, identity) is observed in relation to time. For example, as time passes and events develop, a person's marital status may change (from "single" to "married", and then from "married to John" to "married to Henry"). Similarly, an employee may be promoted and thereby "add new identities" and "shed old identities". She is promoted to an executive position with a compensation package that makes her a shareholder of the employer. She now has gained two new identities for two different contexts—a part-owner for the personal tax reporting context, and an executive "insider" for the securities laws context. Similarly, a person ages and his photo ID driver's card loses its legal validity unless updated with a current photo. Thus it is seen that "identity" changes realistically with the passage of time because "contexts" change realistically with the passage of time. Not only do new variables come into play or leave, but also their values change. For example, the variable of "credit history/risk" is created upon a person entering the marketplace on credit and thereafter, the values for that variable change according to his participation. Identities are dynamic.

Another temporal aspect of context (and thereby identity) is the rapid assumption and dissolution of identities in a very short time. This aspect can be seen in the example of a company's annual general meeting of shareholders. A person walks into the meeting with his "personal pool" of personal attributes (e.g. relating to sex, marital status, income, residence, shareholdings, employment status, citizenship, etc.). The meeting chairperson asks all who are shareholders, to raise their hands. After reviewing the show of hands and physically excluding those who are not entitled to remain (e.g. not being a shareholder), the chairperson presents to those remaining, a first motion (to change the company name) and indicates that only class A shareholders are entitled to vote thereon. After the vote, he presents a second motion (to modify the borrowing powers of the company) and indicates that only class B shareholders without debt conversion rights, are entitled to vote thereon. And so on. Each person at the meeting determines if he or she is entitled to vote on each motion as presented, and votes or remains silent accordingly. One person may find that within a short period, he qualifies and votes twice whereas another person finds in the same short period, that he is entitled to vote on only one motion or on none. For each context (attendance at the meeting, the first motion, the second motion), several persons may have the same sought identity or none may have the sought identity. For each context, a person "assumes" and "sheds" his respective identity (shareholder, class A shareholder, class B shareholder, or not) from his "pool" of personal attributes, and then continues with his "pool" until confronted with the next context (perhaps upon arrival at home and greeted by his family). This "quick" assumption and shedding of identities (from a "pool" of potential identities) as different contexts develop, suggest that identities are dynamically multi-dimensional and episodic.

Other analogies are similarly suggestive. In the chemistry lab, a solution of chemicals will precipitate (and un-precipitate) according to the introduction of other chemicals selected by the chemist and not otherwise. As hypothesized by theoretical physicists, it is the act of observation by an interested party that collapses a wave function into an observable particle, and not an instant before or after. The proteome is the complete set of proteins that are expressed by the genome of a cell at any one time. What is (un)expressed and when, is the result of a complex set of factors and processes operating at any point in time (i.e. genes are "inert" and require for their expression, higher-order, complex biochemical (protein-protein/nucleic acid) interactions of cells).

The network version of the "identity" of the above analogies related to an individual, is (in network vernacular) the "address" of a network element (or of a Station or Network Device in the preferred embodiment). Hereinafter, "identity" and "Contextual Address" are often used interchangeably, differing only in their level of abstraction, the former being more conceptual and the later being an embodiment or instantiation of the former in the explanation of the Contextual Addressing Scheme. The CAS teaches that for network addressing, instead of asking "where" something is, it is advantageous to ask "who" something is (for effective engagements for interacting with the operating environment). This invention recognizes that in some situations (to modify Gertrude Stein slightly) "there is really no "where", there". Instead, the person asking (inquisitors such as the travelling vacuum cleaner salesman, the department store customer seeking more credit, the company meeting chairperson), asks "who?" of his audience (the inquisitees), i.e. "are you the lady of the house?", " . . . the credit department manager?", " . . . a class A shareholder?". Although part of "who" may include an aspect of "where" for some contexts, the point of this invention is not to restrict the "who" to "where" (as some Traditional Addressing Schemes do) but to "enrich" the "who" with context to enable a network element to become a more useful participant in the life of the network and thereby facilitate effective engagements to achieve desired complex actions.

In the above company meeting analogy, the chairperson is not as interested in "where" any of the shareholders are in the meeting room (after determining their entitlement to be present), as he is in "who" they are (for the purposes of entitlement to vote on various motions). The analogy between this invention's Contextual Addressing Scheme and the body's immune system, in their similar (initial) emphasis on asking "who?" ("are you a dangerous substance or a friendly one?") over asking "where" ("where are you in the body?"), suggests itself. This "chemo-communication" analogy is amplified below after the CAS is explained.

Identity (and thus any instantiation in a "network address" or an "addressable" network element) advantageously does not exist outside of context. Properly and thus advantageously understood, identity—and thus network address—are co-terminous with context-continually crystallizing and dissolving with changing contexts. As contexts "come" and "go" for a station, so does its identities (and its "network addresses"). Within a very short period of time, a station may "take on" and "take off" several identities/network addresses. No CAS Station in the CAS network has a static address or identity.

Also, a CAS Station cannot have a unique address generally—it will create its Contextual Address that is unique if and only if, for a given context, no other CAS Station creates the same Contextual Address. The CAS contemplates that several CAS Stations will create for themselves the same identity/network address, for a given context. In the preferred embodiment's electric utility network, for one context, a station is one (of perhaps several) in a certain geographical area. In another context, that same station is one (of perhaps several) (whose customer is) being billed according to a certain billing plan. In yet another context, that same station is one (of perhaps several) drawing excessive power at a certain point in time from a certain power feeder line.

Thus all CAS Addresses are episodic (i.e. time-wise) in particular, and more generally, they are all contextual (i.e. informed by context provided by those asking and those answering, at the time of asking and answering).

Static addressing schemes imply a frozen set of addressable entities, which in turn implies that the communications system in particular, and the super-system or complex generally, is not changing over time in response to its operating environment that typically is changing over time. Because CAS is "time-granular", it provides for a realistic, dynamic, communications system that changes over time, often in response to stimuli (typically but not exclusively, from the operating environment), and sometimes needs to change itself (e.g. periodically or event-driven maintenance or repair).

According to this invention, efficiently identifying and addressing stations in a network is based on the recognition that addresses follow identities (the "who") on a one-to-one basis, and that identities do not exist outside of particular contexts. Put simply, a CAS Station's address—its identity or its Contextual Address—is a creature of multi-dimensional context that in many settings, realistically changes with time.

The Contextual Addressing Scheme or CAS, is an addressing scheme based on contexts that are defined by "inquisitor" and (i.e. with) "inquisitee" (CAS Inquisitor Station and CAS Inquisitee Station respectively). Specifically, the Contextual Addresses are created "on the fly", not by the "inquisitor" but by the stations queried by the "inquisitor", such addresses depending on the viewpoint of the "inquisitor" (who he is looking for) and the "make-up" or contexture of the "inquisitees". A "CAS network" is a plurality of network elements (CAS Stations), which communicate thus: one station (the CAS Inquisitor Station) has the functionality to send a particular type of message (the CAS message), and other Stations (the CAS Inquisitee Stations) each having the functionality to receive that CAS message and to identify themselves accordingly (by creating Contextual Addresses for themselves). See FIG. 2 for an idealized format of the CAS message. There are similarities between, and identities of, portions of the CAS message (of FIG. 2) and of the TAS message (of FIG. 1), especially the management control portions. But the CAS counterpart to the TAS ADDRESS field is crucially different, explained next.

Unlike a TAS message that has an address that identifies (explicitly or implicitly the location—the "where", by analogy—of the intended destination of the message), a CAS message is sent with no such address. Instead, a typical CAS message has a Contextual Function (having at least Contextual Variables that are related in a way relevant to the sought identity) and a Payload. A CAS Inquisitee Station has its Contextual Attributes (being those Contextual Variables holding its Contextual Values therefor). When the CAS message encounters the Inquisitee Station's Contextual Attributes (and in particular, when the CAS message's Contextual Function is processed by the Station on its Contextual Attributes), that Station is Contextually Addressed thereby.

The above Contextual-derived concepts and primitives, are explained below. Until then, it is sufficient to think of the "inquisitor" as the CAS Inquisitor Station whose "viewpoint" (of what it is interested in) is encapsulated in the CAS message it sends, and in particular, its Contextual Function represents part of the context for which the CAS Inquisitee Station identifies itself. The identity is the result of the encounter of that CAS message (inquisitor's "viewpoint") with the Contextual Attributes of the CAS Inquisitee Station (its "makeup").

When the CAS Inquisitor Station sends a CAS message, a station that has the functionality to "hear" that CAS message (i.e. has the functionality to decode it at the appropriate level of decoding so that the Contextual Function of that CAS message is applied to the station's Contextual Attributes to determine, typically, whether that CAS message was intended for it as a sought station to bring about (a part of) a desired complex action), is a CAS Inquisitee Station.

If the communications (i.e. the sending and receiving of CAS messages) is implemented by wireless technologies, the CAS Inquisitor Station can be considered to "broadcast" (to use RF terminology) the CAS message, and each station that receives and processes that CAS message to decide whether that CAS message was intended for it, is a CAS Inquisitee Station.

In the preferred embodiment, the term "broadcast" meaning the physical point-to-multipoint transmission of RF signals, via communication proxies), is called "RF broadcast". That is to distinguish from "IP broadcast" which refers to a message sent to all stations in a network operating on an IP addressing scheme or other types of broadcasts (e.g. under IEEE 802.11) which refer to Traditional Addressing schemes.

Below are observations, with examples, about the nature of the CAS.

For example, consider FIG. 3 and the following example, where the notation [frequency(ies)] refers to the frequency(ies) that station is tuned to transceive at. Consider Station A [frequencies #1 and #2] and stations B [frequencies #1 and #2], C [frequency #1], D [frequency #1] and E [frequency #2]. Base Station A RF broadcasts a first message (at frequency #1), and Stations B, C and D receive and process it (station E is not tuned to receive at frequency #1). Then the CAS network consists of CAS Inquisitor Station A and CAS Inquisitee Stations B, C and D. Station E is "deaf" to the first message and so is not a CAS Inquisitee Station and is not part of the CAS network for the purposes of message #1. Continuing the example, when Station B (which was a CAS Inquisitee Station in the preceding example of message #1) later RF broadcasts a second message (at frequency #2) that is received by stations A and E (but not stations C and D, which are not tuned to receive at frequency #2), then the CAS network for the second message consists of Station B as the CAS Inquisitor Station, and CAS Inquisitee Stations A and E.

An analogy to the preceding example, might be found at the United Nations, where some speakers are multi-lingual and some are uni-lingual and they participate in a plurality of (written or oral) interactions—herein "conversations" for simplicity of expression. On any given day, several conversations are being carried on. What determines an individual's participation in a given conversation is not the means of communication (oral or written) but rather the ability to converse in the relevant language. Those who speak more languages obviously participate in more conversations. A Swiss diplomat may be a listener in one (e.g. French) conversation for a particular statement made by a speaker therein, and be a speaker (for his particular statement) in another (e.g. German) conversation. Those who only speak English do not participate in either of the two preceding conversations.

The aforementioned "deafness" of a station in respect of a CAS message (that disqualifies it from being a CAS Inquisitee Station for that CAS message) can be the result of any designed incompatibility with the CAS Inquisitor Station (including that related to frequency tuning (the example explained above with FIG. 3), modulation scheme, communications protocol or simply being located too remotely for wireless communication of that CAS message). Herein, in respect of CAS, "deafness" is purposeful (by design or as a consequence of design), so that "deafness" does not include inability to hear that results from equipment failure, accidental or fleeting impairment of the communication channels (e.g. because of moving foliage) and the like.

All stations in a network are CAS Stations in respect of a CAS message except for those that are "deaf" to it. A station that cannot receive a CAS message, is by definition, not a CAS Inquisitee Station and is not part of the CAS network, for the purposes of that CAS message. That said, this invention does not abandon "deaf" stations because they are part of the fabric of a more general and concrete reality of hybrid networks. Although the CAS cannot include "deaf" stations, there are inventive ways of accommodating them by including their efforts into the life of the network (discussed below with "custodians").

It was indicated above that, in contrast to the TAS, the CAS does "not know" (and does "not care") "where" any of the sought CAS Stations are and obviously does not use its ignorance to send a CAS message. The CAS, regardless of which OSI layer(s) it is implemented at, simply relies on the proper performance of all OSI layer protocols below the respective layer(s) of its implementation that relate to sending and receiving a CAS message between a CAS Inquisitor Station and CAS Inquisitee Stations. The CAS assumes and requires nothing more. Such assumption relieves the CAS from having to "know and use" Traditional Addresses when sending a CAS message. Even after a sought CAS Inquisitee Station responds to a CAS message by communicating with the CAS Inquisitor Station, the CAS Inquisitor Station in particular, and the CAS network generally, still does "not know" necessarily "where" that responsive CAS Inquisitee Station is.

For example, and continuing with FIG. 3, consider that Base Station A and stations B, C and E communicate on TCP/IP protocol and its hierarchical Traditional Addressing Scheme (where each station has its unique, fixed IP address). Suppose Base Station A sends a CAS message on a multicast format (based on an IP addressing scheme) directed to a designated subset of IP addresses of which stations C and E are members. Then the CAS network, for the purposes of that (multicasted) CAS message, consists of CAS Inquisitor Station A and CAS Inquisitee Stations C and E.

It may be that the Base Station (or a communication proxy(ies)) "knows" "where" each CAS Inquisitee Station is (physically or logically), and it may even use that knowledge (i.e. a Traditional Address Scheme) as part of its (lower OSI protocol layered) processes to send the CAS message to the CAS Inquisitee Stations (as the above multicast example shows). But that Base Station-Network Device, qua CAS Inquisitor Station, does not know "where" any of the CAS Inquisitee Stations are.

Consider the analogy of two OSI application layer programs, each on its own computer, communicating on TCP/IP protocol with each other. While it is conceivable that these two programs know and use the IP address of the network interface of each other in order to communicate with each other, more likely, that knowledge and use is transparent to the programs themselves, at the OSI application layer, although that knowledge and use are part of the processes of communication between them. Generally the two application programs operating on their respective computers, qua application programs, do not know and do not care "where" the other is, and simply assume that lower layer protocols are being handled to effect communications with each other.

To return to the company meeting analogy, the chairperson may use various techniques to convey his motion voting instructions. He may simply speak loudly if the meeting room acoustics are sufficient, or use a microphone/speaker system for a large room, or hand out written instructions (one copy or several) that he asks those closest to him (his assistants or those of the audience) to pass along to the remainder of the audience (with or without his instructions to a specific method of passing along or a reference to the meeting's seating topologies or other implementation details). He does not care how his voting instructions are conveyed and received by his audience as much as he is singularly concerned that his audience learn his instructions.

The CAS is agnostic or neutral on the (physical and logical) topology so that the stations may be organized in a mesh, bus, star, ring or branched tree (physical or logical) topology or some combination thereof, or with no stable topology at all.

The CAS Inquisitor Station may be at the root of a tree topology (the analogue would be the Base Station in an electrical utilities telemetry network) or at the root of a branch of a tree (the analogue would be the controller of a large factory subnetwork). The CAS Inquisitor Station may be the station that has the token and mastership of a ring network. Nothing in the definition of "CAS network", "CAS Inquisitor Station" and "CAS Inquisitee Station" precludes a station from being a CAS Inquisitor Station at one instant and a CAS Inquisitee Station at another instant (as explained above with FIG. 3)

The CAS does not care how the CAS message is sent by the CAS Inquisitor Station to the CAS Inquisitee Stations. The examples below show the agnostic attitude of CAS on "how" a CAS message is sent and received—it simply assumes that the technical infrastructure is present and functioning so that a CAS message is received by all CAS Inquisitee Stations.

For example, the CAS message is RF broadcast by the CAS Inquisitor Station and it finally arrives at a physically remote CAS Inquisitee Station through one or more communication proxies. In particular, the CAS Inquisitor Station may use a direct way of sending a CAS message to one CAS Inquisitee Station (such as a RF broadcast without repeaters) and may use another, indirect way of sending the CAS message to another, more physically remote CAS Inquisitee Station. For example, the CAS Inquisitor Station is a Base Station in a WAN operating on a first communications protocol and one of the CAS Inquisitee Stations is in a LAN operating on a second communications protocol, and there is a gateway converter between the WAN and LAN where the first communications protocol is a hierarchical, TCP/IP and the second communications protocol is a non-hierarchical protocol.

For example, the CAS network is agnostic about whether the communications protocols are connection oriented (e.g. circuit-switched wired, X.25, TCP/IP) or connection-less (e.g. TCP/UDP).

Routing, if there is any, may take any conventional form. For examples: directory routing (where each station/element maintains a table for each possible destination), hierarchical routing, static or dynamic routing, centralized-Base Station directed routing, ad-hoc isolated routing between particular stations, delta/hybrid routing, distributed routing, session routing, broadcasting routing. The CAS does not care about routing in particular—it generally assumes that the communication channels are operational to convey the CAS Inquisitor Station's CAS message to the CAS Inquisitee Stations.

Herein, the CAS generally, and the CAS Inquisitor Station's CAS message in particular, provides no assistance for routing or bridging (if they are performed). A hierarchical TAS address is one that provides information about "where" the station is (i.e. its approximate topological location), that the network parses or otherwise uses to perform routing from source to destination. Quite the opposite, the Contextual Address is a creation by each CAS Inquisitee Station for itself in response to a CAS message it received at the end of the communications path from the CAS Inquisitor Station, and therefore has therefore no (topologically, physically or other) significant information for sending that CAS message.

Definitions.

Above, the concept of identity was introduced with examplary references to individuals (for example, chatelaine and shareholder). The concept was then transplanted to the network situation, where individuals were replaced with "stations". The term, "station" is used mainly in the conceptual explanation of Traditional Addressing Scheme and of Contextual Addressing Scheme for networks.

The term "Device" is used mainly in the preferred embodiment of a wireless electric utility telemetry network, where it refers to Network Devices that function as: (1) a central intelligence, the Base Station, (2) a communication endpoint or (3) a communication proxy operating between the Base Station and a communication endpoint. There is an approximate functional equivalence of a (TAS or CAS Inquisitee) Station (in the explanation of TAS and CAS above) and the preferred embodiment's Network (LAN or WAN) Device, with the latter being the preferred embodiment implementation of the conceptual former (with differences explained below). Thus both "Device" and "Station" terminology are used interchangeable herein, with exceptions.

One exception to the approximate equivalence (in the preferred embodiment) is a Network Device that (by design) cannot receive any messages (and in particular, a CAS message) because it has only RF transmitting capability—it is called a LAN Device [RF Deaf], explained below. Another exception is where the use of the term Device is to highlight distinctions in implementation of the preferred embodiment that are not apparent in "Station" terminology. One terminological exception is the term "Base Station" which is used in both the CAS explanation and the preferred embodiment to refer to the central intelligence that sends messages in a point-to-multipoint transmission or receives messages from the endpoints. This element retains its "station" terminology when engaging other Network Devices in the preferred embodiment.

Each CAS or TAS Station (and in the preferred embodiment, each Network Device) is "Time Sentient", meaning herein as having the functionality to measure the passage of time. The Time Sentience of the network as a whole is created by the Base Station, as the time metric, "Network Time". If a Station can and does calculate the passage of time in coordination with other parts of the network (e.g. with other network intelligence, including in particular, with the Base Station's Network Time), its Time Sentience is considered "full" and its "time" is, in effect, Network Time; and if a Station cannot so calculate in coordination with others, its Time Sentience is considered "limited", and its "time" is purely internal and is called Relative Time. A fully Time Sentient Station, upon resumption of power after a power disturbance, will temporarily keep Relative Time until it becomes re-coordinated with Network Time.

Consistent with the "context" theme, the terminology of "Contextual Variable", "Contextual Value" and "Contextual Attributes" is used in both the CAS explanation above and the preferred embodiment's wireless telemetry utilities network.

The terms "Business" and "Manufacturer" herein are understood as follows. The Manufacturer makes the Network Devices and provides possession or control thereof (under a sale, lease or other suitable legal arrangement) to a Business, who operates it for customers (in the preferred embodiment, the Business is the electric utility delivering power to its commercial, industrial and residential customers). While almost all of the operational management of the network is normally performed by the Business, some fundamental residue of network management will be retained by the Manufacturer. Typically, the Manufacturer is concerned about maintaining the underlying integrity of the network, administrative and like infrastructure-related functions of the network operated by the Business.

The term, "Business-motivated" means, for economy of expression, motivated by a Business and manipulable by it. A Business is typically interested in organizing its customers and its services according to its business models and processes (e.g. billing plans, "accumulating" physically proximate customers into groups, etc.). The Business does "Business-motivated" manipulation by sending Base Station message commands (by Traditional Addressing or Contextual Addressing) or by employing handheld technologies in the field on the Network Devices of interest.

The term, "Manufacturer-motivated" means, for economy of expression, motivated by the Manufacturer and exclusively manipulable by it (i.e. cannot be manipulated by a Business). The Manufacturer typically does Manufacturer-motivated manipulation at its factory or service center before the Business takes possession of the Network Device but can also manipulate later (e.g. on the Network Devices of interest, by handheld technologies employed in the field). In practice, the Manufacturer (or some other party, perhaps the Business under certain legal arrangements) must and does retains a default and absolute network-wide ability, as "system administrator", to manipulate everything, including anything that a Business can manipulate (i.e. it can manipulate as a Business). In that sense, "Business-motivated" is a subset of "Manufacturer-motivated".

The terms "Business-motivated" and "Manufacturer-motivated" are used herein mainly with the Contextual Addressing Scheme (e.g. Contextual Variables) and Traditional Addressing Scheming (e.g. Network ID). Accordingly, derivative concepts and terms, like "Business Contextual Attributes/Variables/Values" and "Manufacturer Properties" are used (as explained below). "Business-motivated" is also used with parameters (thresholds, periods of time, etc.) used in processes like PQM, Plug & Play (as explained below).

Manipulation includes changing a Contextual Variable and changing the Contextual Value therefor. A specific case of the latter is "ascribing" Contextual Values to Contextual Variables to form Contextual Attributes, and is explained below.

In the aforementioned encounter of a Contextual Function with a CAS Inquisitee Station's Contextual Attributes that results in the creation of that Station's Contextual Address, the creation follows that encounter forthwith as the result of fast implementing technologies. So it can be fairly said that the Contextual Address is created upon reception of the CAS message. But as explained below, the creation can be purposively postponed beyond that encounter (as part of a desired complex action, for example).

The CAS does not require that the creation of Contextual Addresses occur absolutely simultaneously throughout the CAS network. A measure of simultaneity is achieved to the extent that the implementation technologies facilitate. For example, in the wireless utilities telemetry network of the preferred embodiment, the nature of certain RF technologies provide very fast communications and it can be expected that the Contextual Addresses of all CAS Inquisitee Stations in a CAS network for a given CAS message, are created at "about" the same time. But even in the RF implementation of the preferred embodiment, factors such as the level of network traffic, bottle-necking in certain locations, the amount of "daisy-chaining" or use of communication proxies, the physically remote location of a particular CAS Station, the overhead of Traditional Addressing protocols used (if any), and other familiar latency-affecting factors, will degrade simultaneity. That said, the degree of simultaneity required (i.e. the degree of granularity of response time to a CAS message) depends on the desired complex action. For example, for a CAS message, "all stations on power feeder line #7, report your power consumption now", a delay over 5 minutes for all such sought stations to report, may be intolerable. In contrast, for a CAS message of "all stations on billing plan #2, shut down", a delay of an hour may be tolerable. The point is that the CAS does not impose an absolute simultaneity of crystallization of all Contextual Addresses (and of any consequential payload processing by sought CAS Stations) throughout the CAS network.

Similarly, the CAS does not require that the CAS Inquisitor Station send the CAS message to all CAS Inquisitee Stations at the same time. For example, it can send the CAS message to some CAS Inquisitee Stations, wait, and then send the same CAS message to the remainder of the CAS Inquisitee Stations.

Contextualization produces identities/addresses. In particular, according to this invention, the Contextual Address of each CAS Inquisitee Station in the CAS network, is the encounter of (a) a Contextual Function sent by the CAS Inquisitor Station, where the Contextual Function is a (typically mathematical) relationship involving Contextual Variables, with (b) each Inquisitee Station's Contextual Attributes (being Contextual Variables with its Contextual Values therefor). The Contextual Function is analogous to the viewpoint of the inquisitor—it is part of the context within (or for) which the Station can answer the question, "who am I?". The Contextual Attributes of a Station are analogous to an individual's personal attributes (or his makeup or contexture). Once the inquisitor's viewpoint is applied to the individual's "makeup", that individual has an identity that is meaningful to the inquisitor—the queried individual is "addressed" thereby meaningfully. Once context is presented to a Station, it identifies itself by creating its Contextual Address, based on its Contextual Attributes—its Contextual Address "becomes" or is crystallized into existence.

Formulaically, Contextual Function processed by a Station on its Contextual Attributes will create the Contextual Address for that Station. The formation of the "context" is initiated by the sending of the Contextual Function and is informed partially by that Contextual Function and partially by the CSA Inquisitee Station's Contextual Attributes at the time of that processing.

The CAS's main components of Contextual Functions and Contextual Attributes (which are Contextual Variables with Contextual Values) are discussed next, followed by an explanation about payloads.

Contextual Functions.

A Contextual Function is the (mathematical, network) analogue of the viewpoint of the person who wants to know (e.g. "As chairperson of this company meeting, I want to know those class B shareholders who are entitled to vote on the pending motion."). That viewpoint (i.e. what is of interest to the chairperson), informs part of the context for each queried person to identify himself (with the other part coming from his personal attributes). In the network context, the Contextual Function partially informs the context for which the CAS Inquisitee Stations identifies itself as being sought (as part of effective interactions for a complex action desired by the Base Station in the preferred embodiment).

The CAS analogue of a Traditional Addressing Message format, is shown in the idealized format of FIG. 2, where Contextual Function CF can be found with conventional preambular and like components (as with FIG. 1 TAS format).

Below are four examplary Contextual Functions CF1 to CF4 being received by CAS Inquisitee Stations. Each CAS Inquisitee Station has Contextual Variables (CVar1, CVar2, CVar3) with their respective Contextual Values (CValue1, CValue2, CValue3) that form its Contextual Attributes $\{X, \Psi, \Omega\}$. The Contextual Function CF has the same Contextual Variables (CVar1, CVar2, CVar3) and relates them (in examplary ways described below). Other than the first, CF1-type of Contextual Function explained next, a Contextual Function also has respective values for those Contextual Variables $\{\chi,$ ψ, ω} such that Contextual Function CF (χ, ψ, ω) represents the identity of CAS Inquisitee Stations sought. The words "becomes" and "creates" are italicized below to emphasize that the Contextual Address is first brought into existence only by the CAS Inquisitee Station when its resident intelligence receives the CAS message and processes the CAS message (in particular, the Contextual Function) on its Contextual Attributes—the Contextual Address does not exist before or after.

I. Contextual Function CF1=(CVar1 LOGIC1 CVar2) LOGIC2 CVar3 where LOGIC(i) is any traditional Boolean operator {e.g., AND, OR, XOR, NOT, NAND, NOR, XNOR}.

When a CAS Inquisitee Station receives CF1 from the CAS Inquisitor Station, and processes it on its Contextual Attributes {X, Ψ, Ω}, its Contextual Address becomes <(X LOGIC 1 Ψ) LOGIC2 Ω> for the context whose formation was initiated and partially informed by that particular CF1 and by partially informed by its Contextual Attributes at the time of processing, and only for that context.

If {CVar1, CVar2, CVar3} represent Contextual Variables of {height, weight, sex} then CF1 is {(height OR weight) AND sex}. If two CAS Inquisitee Stations have Contextual Attributes of {1.8 meters, 68 kg, Male}, then the Contextual Address of those two Stations becomes <(1.8 meters OR 68 kg) AND Male>. In colloquial terms, CF1 asks all stations to identify themselves with their respective, specified physical attributes of {(height OR weight) AND sex}.

It is seen that Contextual Function CF1 from the CAS Inquisitor Station, is used by a CAS Inquisitee Station on its Contextual Attributes to create its Contextual Address for (and only for) the context informed by that CF1 and its Contextual Attributes at that time of creation. At another time, the context might be different (e.g. gain weight) and the resulting Contextual Address would be different.

Although CF1 results in the creation of a Contextual Address, the next examplary Contextual Function CF2 advantageously goes further by providing information related to what the CAS Inquisitee Station seeks (for the desired complex action), and having the CAS Inquisitee Station ask whether the Contextual Address created by a CAS Inquisitee Station is a sought one.

II. Contextual Function CF2 is {CVar1 LOGIC1 (CVar2 LOGIC2 CVar3)} and carries {χ, ψ, ω}, where LOGIC(i) is any traditional Boolean operator and {χ, ψ, ω} is such that the CF2 (χ, ψ, ω) represents the sought identity (from the point of view of the CAS Inquisitor Station for a desired complex action).

Upon receipt of CF2, the CAS Inquisitee Station COMPARES CF2(X, Ψ, Ω} WITH CF2 (χ, ψ, ω). The result, for the context whose formation was initiated and partially informed by that particular CF2 and by partially informed by the Contextual Attributes at the time of execution, and only for that context, is that Station's Contextual Address. If the comparison does not match, the CAS Inquisitee Station's Contextual Address becomes "null" for that context. If it matches, the CAS Inquisitee Station's Contextual Address becomes for that context:
<X LOGIC1 (Ψ LOGIC2Ω)> which is identical to <χLOGIC1 (ψ LOGIC2 ω)>
and the CAS Inquisitee Station will consider itself to be one sought by the CAS Inquisitor Station (the Base Station for effective engagements for the desired complex action).

For example, {CVar1, CVar2, CVar3} represent {location, customer type and commodity measured}, and {χ, ψ, ω}={North West, factory, electricity} and CF2 is {location AND (factory AND NOT electricity)}. The CAS Inquisitee Station COMPARES {North West AND (factory AND NOT electricity)} WITH its Contextual Attributes. In colloquial terms, Contextual Function CF2 asks all stations to identify themselves which are, at that time, in a factory in the North West and not measuring electricity (i.e. measuring gas or water consumption). For that context, such stations will have created their Contextual Address of:
<"North West" AND ("factory" AND NOT "electricity")>
and the other stations will have created a "null" Contextual Addresses (i.e. "null" identities) for themselves.

To summarize, while both Contextual Function CF1 and Contextual Function C2 require that all CAS Inquisitee Stations create identities/Contextual Addresses for themselves, CF1 does not do more but CF2 does more by carrying information {χ, ψ, ω} for the CAS Inquisitee Station to use to determine if it has the identity/Contextual Address sought by the CAS Inquisitor Station. The preferred embodiment is described below with examplary CF2-type Contextual Functions.

The operational advantage of CF2 for effective engagements, is that the payload (explained below) can be processed by those stations who have determined that they have the sought identity/Contextual Address, immediately after so determining. In an analogy at the airport gate, when the agent there announces, "Those with young children or need assistance, please proceed to the gate now . . . ", the identification of the sought individuals and their performance of the desired action, is performed by the travelers immediately without further action or communications by the agent.

Note that simply comparing Contextual Attributes {X, Ψ, Ω} with {χ, ψ, ω} is not inherently useful because that comparison might be missing part of context (i.e. the part provided by the Contextual Function). For example, depending on the Contextual Function CF's LOGIC, a Contextual Function processed on a set of operands may match that Contextual Function executed on a different set of operands, and so a simple comparison would have "missed" something. That said, a simple comparison (which is really an extremely simply Contextual Function), can be of some use for some desired complex actions on operating environments, as follows. The above "compare and match" mechanism that identifies the sought stations, does so on an "either/or" basis. In a variation, relevancy can be on the basis of "compare and be within a prescribed difference" (or "within a prescribed Hamming distance", to use an analogy), to create "roughly granular" snapshots. For example, a Contextual Function CF requires a match of at least any four of five Contextual Attributes and to be within a prescribe deviation for the unmatched one, in order for a station to be a sought station. This variation leads to the next examplary Contextual Function.

III. Contextual Function CF3=a "fuzzy logic" Contextual Function.

Whereas LOGIC(i) in Contextual Functions CF1 and CF2, were simple Boolean operators, fuzzy logic recognizes more than simple true and false values. Fuzzy logic propositions can be represented with degrees of "truthfulness" and "falsehood" to align with "real world" lack of "crispness" in some metrics.

For example, when there is excessive load on the electric power grid, it is desired to identify customer users who are not a good credit risk and also are using unusually more power now. Assume that a station has Contextual Values such as historical power consumption and bill payment history.

With operators like:

$$A \text{ OR } B = \text{Max}((\epsilon A(x), \epsilon(B(x)))$$

$$A \text{ AND } B = \text{Min}((\epsilon A(x), \epsilon(B(x)))$$

and hedges or modifiers of fuzzy values such as "very" $A(x)=A(x)^2$ and "more or less" $A(x)=\sqrt{A(x)}$, and $\epsilon$ is the membership function,
and
$\epsilon A(x)$=power consumption=
 1.0 where x is 50% or more over the last period's values
 1/6 where x is between 5% and 50% over
 0.25 where x is between 5% and 1% over
 0.0 otherwise
and
$\epsilon B(x)$=bad credit risk=
 1.0 where unpaid bills are over 180 days
 0.5 where unpaid bills are over 90 days
a Contextual Function CF3 can be developed that asks colloquially, for example, stations whose power draw now is "unexpectedly very high" (i.e. relative to their historical consumption) and (whose users) are "more or less" bad credit risks, to identity themselves. Those so identified would then process the associated payload (e.g. instructions to disconnect power).

IV. Contextual Function CF4 is a combination of $\Pi$, $\int$, $\Sigma$, logarithms and other sophisticated mathematical functions with Contextual Variables, all chosen to model physical situations presented by the operating environment, assist in artificial intelligence/expert systems decisions on business aspects of operating the network interacting with the operating environment, and the like.

It is observed from the above examplary Contextual Functions CF I to IV, that it is the Contextual Function received (i.e. the viewpoint of the CAS Inquisitor Station or, in the preferred embodiment, the Base Station) that recognizes and creates the multi-dimensional nature of the station's identity/Contextual Address. For example, if a Contextual Function CF considers a station's three Contextual Variables {CVar1, CVar2, CVar3}, the resulting Contextual Address could be one dimensional (CF=numerical average of {Contextual Attribute 1, Contextual Attribute 2, Contextual Attribute 3}; two dimensional, three dimensional (e.g. CF1 above), or more.

It is also observed from the above examples, that the dimensions of a CAS Inquisitee Station's identity/Contextual Address are related by the Contextual Function CF received. The dimensions may be related to each other without limitations: linearly, non-linearly (polynomial, rational, exponential, trigonometric functions), orthogonally, by Boolean or fuzzy logic operators, etc. Thus it is seen that the CAS Inquisitor Station (i.e. its operator, whether the Business or the Manufacturer) through its choice of Contextual Function, controls all aspects of the dimensionality of the Contextual Addresses of CAS Inquisitee Stations (but without each CAS Inquisitee Station's Contextual Attributes, the context is not complete).

There are no inherent restrictions on the dimensionality of the Contextual Address because there is no inherent restriction on Contextual Function CF. Implementation of this invention for the sophistication of the Contextual Address is constrained only by limits of implementing technologies (e.g. the capacity and capabilities of data storage of stations, the processing capability of the stations, etc.). A simple examplary implementation of CF2 is found below in conjunction with Table 1 below.

Contextual Variables, Contextual Values and Contextual Attributes

A Contextual Variable is a variable related to a CAS Inquisitee Station and its identity or Contextual Address. A Contextual Variable and its Contextual Value exist independently of the station's Traditional Address (assuming it has one).

In the preferred embodiment, Contextual Variables are chosen (in cooperation with the Interaction Modules) for their assistance in modelling and formulating desired complex actions with the operating environment. Generally, for a given CAS network (e.g. any of the three shown in FIG. 3), all CAS Stations thereof (Inquisitor and Inquisitee Stations alike) must share the same semantical framework schema, including in particular, the same set of Contextual Variables. For a given CAS network and its shared set of Contextual Variables, (1) each CAS Inquisitee Station has its Contextual Values for that shared set of Contextual Variables, to form its Contextual Attributes; and (2) a Contextual Function CF has that same set of Contextual Variables.

Insight into the nature of Contextual Variables and their role in addressing for effective engagements, is provided by considering below, four examplary types of Contextual Variables (with references to preferred embodiment implementations).

Type A Contextual Variables. These relate to "infrastructure" attributes of the Station (e.g. the version of firmware and hardware of the resident intelligence or the "Device Type", such as LAN Device [RF Deaf]).

Type B Contextual Variables. These relate to a physical metric or aspect (e.g. quantity or quality) that is (directly or indirectly) readable, observable, detectable or measurable (collectively, for economy of expression herein, "sensed" or "measured") in "real time", by the CAS Inquisitee Station. For an Interaction Module that is a sensor, what is typically measured is the operating environment (e.g., the power measured by the watthour meter or improper tampering by a tamper detector). The examplary power measurement Contextual Variable is a good example of the dynamic effect of the operating environment on context and therefore on potential identity—in many settings, the value of that Contextual Variable changes (increases) daily, if not hourly or even by the minute.

Type C Contextual Variables. These relate to the customer-user of the CAS Inquisitee Station (e.g. his credit rating, billing plan, his legal rights to the Interaction Module, historical power usage, historical bill payment history) or the utility Business operating the CAS network (e.g. identification of the CAS Inquisitee Station's Interface Module-meter as a serial meter #, or the power feeder line # that the metered line is connected to).

Type D Contextual Variables. These relate to things "beyond" types A-C such as the network environment of the CAS Inquisitee Station.

As a first type D example of the influence of, and interaction with, the network environment, consider a CAS Inquisitee Station that is fully Time Sentient. Accordingly, a Contextual Variable may relate to its time whose Contextual Value derives (directly or indirectly) from other CAS Stations, either "globally" (i.e. Base Station's Network Time) or "regionally". For the latter, suppose a CAS network straddles the time zone line between Pacific Time and Mountain Time. That fully Time Sentient CAS Station's time may be coordinated with those of its physically proximate neighbours (e.g. those in same time zone) and would be ahead of or behind CAS Stations elsewhere in the CAS network (that are in the other time zone and are coordinated accordingly).

As a second type D example of the network environment, a Contextual Variable relates to the conventional "where" a CAS Inquisitee Station is, e.g. its (physical or logical) location relative to its (physically or logically) "neighbouring" CAS Inquisitee Stations. For example, that "where" is its location in a routing topology like a linked list or as part of an IP addressed network.

Before explaining payloads, below are observations and explanations about Contextual Variables.

Although the examplary Contextual Variables were identified above with high-level symbolic monikers (e.g. billing plan #, power feed line #), the symbolic level can be very low. For example, {CVar1, CVar2, CVar3} may be addresses in the station's memory (e.g. hardware buffers and registers) that store "low level" physical aspects measured (e.g. voltage).

Ascribing Contextual Values to a Station's Contextual Variables to Form its Contextual Attributes Contextual Values (in conjunction with Contextual Variables to form Contextual Attributes) can come from many sources and methods. Although implementation technologies and the like may impose constraints on those sources and methods, the CAS imposes no constraints. Herein, the general process of manipulating the Contextual Value of a Contextual Variable (i.e. providing a value) is termed "ascribe". Some Contextual Values are ascribed to Contextual Variables by programming. For example, the meter serial #, the credit risk rating of the customer and the power feeder line # (Type C Contextual Variable) are programmed-ascribed by the Business. For another example, the firmware and hardware version (Type A Contextual Variable) are programmed-ascribed by the Manufacturer. In contrast to ascribing by programming, some Contextual Values are ascribed by the Station's interaction with the operating environment (e.g. by measurement through its sensor-Interface Module—Type B Contextual Variable) or coordination with its network environment (e.g. obtaining Network Time—Type D Contextual Variable).

Environment

Although the "network environment" (of a CAS Station) and the "operating environment" (of the super-system or complex) exist in different conceptual regimes, they are not necessarily disconnected. Both are environments in the sense that both are exogenous to the subject CAS Station, and contribute to its Contextual Address/identity. Furthermore, if a CAS Station receives information from a neighboring CAS Station (i.e. from the network environment), that information may be derived from that neighboring CAS Station's Contextual Attributes which are ascribed by sensing from the operating environment (see "Inheritance" below on "receiving information" from others).

Time

A conceptual distinction should be observed between: (i) time as a Contextual Variable of a CAS Station and (ii) the time when a CAS Station creates/crystallizes its Contextual Address. There is a difference between, "those who are seniors (i.e. over the age of 65), please come to the front of the line" and "please take 5 minutes to consider whether you are a senior and those who are, then please come to the front of the line". This invention considers "65 years" to be a Contextual Attribute but does not consider the purposeful postponement of "5 minutes" to relate to a Contextual Variable (although at the implementation level, if postponement is to a certain time in the future instead of waiting the passage of a certain duration after reception of the message, there may be little appreciable difference therebetween). See below on "Contextual Address Postponement" for amplification of when a Contextual Address is created.

Persistent/Flux

Some Contextual Variables will hold relatively persistent Contextual Values (e.g. Type A—firmware version, which will not change except on Manufacturer-motivated manipulation). Other Contextual Variables will hold Contextual Values that typically fluctuate (Type D—time and Type B—measured power, for examples) because the operating environment is dynamic with the passage of time. Thus if a Station's Contextual Attributes have a fluctuating type of Contextual Variable, the Station's "potential" identity/Contextual Address, is constantly changing. To use an analogy, that Station's "genome" is constantly changing and thus what is expressible is constantly changing, regardless of interest or not, in expressing at any given moment.

Endogenous/Exogenous

Type A Contextual Variables can be considered "endogenous" to the CAS Inquisitee Station whereas Types B-D Contextual Variables can be considered "exogenous" to the CAS Inquisitee Station in the sense that they are the product of its environment (i.e. information from the operating environment or information from a logic (including a logic that includes information from its network neighbors) that resides at a level higher than the logic that resides exclusively in the CAS Inquisitee Station). The hostess of a party who asks about, " . . . those who have drunk too much and do not have a designated driver . . . ", refers to "exogenous" information (of consuming alcohol and of having independent means to go home, respectively).

The dividing line between "exogenous" and "endogenous" is in places, porous because the true nature of any identity obviously does not follow a rigidly clear caste system of "exogenous" and "endogenous" (akin to the elusive question of whether a particular personal attribute of an individual is the product of nurture or of nature or both). But the point is that an individual's personal attributes are informed in part exogenously, and similarly, a Station's Contextual Attributes are informed in part from the environment (physical and network environment, in the preferred embodiment), and accordingly, the environment forms part of the context for which an identity is created.

Relationship with OSI

As indicated above, the CAS does not map onto the OSI reference model—see FIG. 4 for an idealized visualization of the CAS relative to the OSI. An implementation of a CAS network can reside exclusively at one OSI layer but also can reside partially at one layer and partially at another layer. Nothing about Contextual Functions, Values, Variables and Attributes and created Contextual Addresses, imprisons their residency to only one OSI layer.

Although FIG. 2 shows a CAS message in a format that might appear to reside at only one OSI layer, note that the FIG. 2 format is idealized. A CAS message does not necessarily map onto a single OSI layer—it can span (or transcend) several OSI layers and so the Contextual Function can be a mathematical relationship of Contextual Variables, one of which resides at the OSI network layer and another at the OSI application layer. The analogy to personal identity is a message that seeks individuals based on two personal attributes— "those male engineers . . . " for example—that exist at different levels—gender and profession—that analogously correspond to the OSI physical and application layers respectively.

Relationship with Traditional Addressing Scheme

The CAS network can be seen as an "overlay" on any underlying addressing schemes (if any) and in fact, does not care what the underlying addressing scheme is (if any) or what communications methods are employed between network elements, as long as the sent CAS message is received by every CAS Inquisitee Station. As an overlay on underlying addressing schemes (if any), the CAS network also can be used "in parallel" or "beside" other addressing schemes (e.g. IP Traditional Addressing schemes or one, as in the preferred embodiment, based on Network ID, for Traditional Messages). Thus, because the CAS can be (and in some embodiments and implementations, is) an overlay on a TAS network or be "beside" a TAS network, a station may be a CAS Station for Contextual Addressing purposes but also be a TAS Station for Traditional Addressing purposes (and thus have its Network ID, explained below). All of that said, it is worth re-emphasizing that the CAS does not inherently require an underlying addressing scheme—a CAS network can be built on or "beside", in a "form fit" way, whatever the network architect provides.

Above, it was stated that no CAS Station in the CAS network has a unique or static address or identity. This should be properly understood. First, no CAS Station, qua CAS Station, has such a unique address or identity. The LAN Device, qua TAS station, for example, that is being Traditionally Addressed, does have a unique TAS address (its Network ID) but that LAN Device, qua CAS Station, for a received CAS message, does not necessarily have a unique address or identity. Secondly, the CAS (unlike a TAS, for example) imposes no requirements of a unique address for each CAS network element (i.e. if it transpires that a CAS Station creates a Contextual Address that is unique for a given CAS message (i.e. it turns out to be the only sought Station), that would be the result of context at the time of creation and not the consequence of an inherent feature of CAS).

Type A is manufacturer-motivated; Type C is Business-motivated; Type B is Business-motivated, subject to limitations of the Interaction Module; Type D is Business-motivated subject to limitations in the rest of the network. Type B interacts with the operating environment and Type D interacts with the network environment; Type A does not interact with any environment and Type C relates to the customer-user of the Station.

As the above observations and explanations show, the four examplary four types of Contextual Variables are neither mutually exclusive, canonical nor exhaustive of what is permissible under CAS. In fact, they suggest an advantageously wide and rich range of Contextual Variables that CAS invites for modelling the (operating and network) environment, and are limited only by the implementing technologies. For example, historical data of a Station may be a worthy Contextual Value to maintain but would be limited by memory constraints of an implemented LAN Device had. Naturally, Contextual Functions are advantageously used to deliver payloads for effective engagements, explained next.

Payloads.

In the human body, when an antibody identifies its targeted antigen ("you are an unfriendly substance"), it then usefully starts a chain of events to unleash a barrage of defense mechanisms against the antigen. Accordingly, by analogy, a payload advantageously accompanies a Contextual Function CF sent so that the sought CAS Inquisitee Stations process immediately the payload as part of the desired complex action.

The term "payload" herein refers to information that the CAS Inquisitor Station, in order to effect the desired complex action, wants the sought CAS Inquisitee Station to have and act on. The payload can be either data to be processed or a function for processing data or both, and herein is called "instructions" for economy of expression.

To illustrate the flexibility and responsiveness of the CAS, three different, examplary types of payloads are explained next for a sought CAS Inquisitee Station.

Type A Payload. The payload is instructions for the sensor-Interaction Module, to measure a specified physical aspect of the operating environment and to send the measurement back to the Base Station.

Type B Payload. The payload is instructions for the effector-Interaction Module, to do a specified act or to stop doing a specified act. As the Contextual Function CF3 fuzzy logic example above showed, in a message with a payload to terminate power, all stations that are unexpectedly drawing too much power and whose customers are credit risky, will have their power terminated immediately. This would be helpful to manage emergency power situations where instant responsiveness is required.

Type C Payload. The payload is instructions to manipulate the Contextual Attributes with a conventional action (like "put, remove, view and change") in respect of (a) the Contextual Value of a Contextual Variable and (b) the Contextual Variable itself.

An examplary action on the Contextual Value of a Contextual Variable of a Station is instructions to replace the Contextual Value of the Contextual Variable of "billing plan" (e.g. from plan #3 for a creditworthy customer to plan #9 for a credit risky one). The Contextual Attribute of "billing plan" is thereby changed accordingly.

An examplary action on the Contextual Variable of a Station is instructions to insert a new Contextual Variable of "measured voltage phase related information" or delete the existing Contextual Variable of "customer credit risk" or to replace the existing one with a new one. For some physical aspects of the operating environment, a simple mathematical transform of a sensor's electrical signal will represent the desired new metric. Generally, the implementation of instructions to change a Contextual Variable, depends on the incumbent resident intelligence (i.e. the resident firmware/hardware platform and the implementation of the subject Contextual Variables thereon). A simple, complex and intermediate examplary case next, illustrate types and range of implementations.

In a simple case, if the Contextual Variables represent addresses in the Station's memory that store or represent various measured physical aspects of the operating environment (i.e. derived from the Interaction Module), the payload is a new location in the Station's memory. Depending on the Station's memory addressing scheme, the payload is a new absolute address, or a new base or offset for indirect addressing, and the like, that would access the new measured physical aspect.

In a complex case, the payload is new subroutine code to be accepted by the Station to overwrite existing code. In an intermediate case, the payload is new branching instructions for the subroutines resident in the Station (or a new key for a lookup table of functions, or a new operand value for a subroutine, or a new parameter value that changes the resident firmware's functionality or its relationship with the hardware).

Also, the payload may be a self-contained routine that is simply executed by the CAS Inquisitee Station (on a one-time run basis) on its Contextual Attributes without requiring anything more of the CAS Inquisitee Station.

Thus it is seen that a CAS message, in addition to having Contextual Function CF, can also carry a payload that is a function (wholly or in part).

Of course, the payload may simply be data and/or functions that are not related to Contextual Attributes—e.g. the desired complex action may be a patch to a software bug or a software enhancement to the user interface of the sought CAS Inquisitee Station.

Thus it is seen that with CAS, a desired complex action (e.g. "all stations on power feeder #7 whose customers are credit risky, shut down power", "all stations in the NE area of town, please send your last information on . . . ", "we are sending the following information (new firmware) to all stations that . . . "), is efficiently performed by an effective addressing scheme wherein the desired complex action is expressed in a way that the relevant portions of the network (the "sought" Stations) identify themselves as being relevant and act according to the received payload.

Contextual Address Postponement

To return to the company meeting analogy, the meeting chairperson says, "This is a complex motion. Even deciding who is entitled to vote is not easy—please listen to my explanation and ask questions, we'll then take a short break of 5 minutes for you to consider and then we'll hold a vote." In other words, the identification of those entitled to vote is purposefully postponed a definite duration.

Just as human language has (past, present, future) tenses when asking "who . . . ?", the CAS network analogue can be similarly "time-shifted". Although a CAS Inquisitee Station normally creates its Contextual Address upon the reception of the CAS message (and in particular, immediately upon the encounter of the Contextual Function on the CAS Station's Contextual Attributes), another variation takes advantage of the Time Sentience of each CAS Station. The CAS message's payload, in collaboration with the CAS Station's resident intelligence, uses the time of the CAS Station to postpone crystallization of the Contextual Address. For example, the payload relates to time by instructing the crystallization to occur at a particular Network Time in the future (for a fully Time Sentient Station) or to occur at the end of a particular delay after reception of the CAS message (for a fully or limited Time Sentient Station).

Below are several concluding observations on the CAS before moving to the preferred embodiment.

The first observation sees that "identity" (which depends on a plurality of Contextual Variables, Values and Functions) resides in a multi-dimensional address space. There is the recognition of that plurality of dimensions (into Contextual Variables and Values) and the relating of those dimensions (using Contextual Functions, typically mathematical functions) as part of the definition of the viewpoint of (i.e. what is of interest to) the CAS Inquisitor Station, and that eventually leads to the context for which the identity or Contextual Address is created by each CAS Inquisitee Station for itself.

The second observation is based on a continuation of the company meeting analogy. The meeting chairperson may have the corporate "minute book" (or summarized equivalent) that lists all the shareholders and details of their shareholdings. Although he can read it and determine and announce the names of those entitled to vote on a particular motion, etc., it is more efficient if he asked that, for example, in one question, "all those who are Class B shareholders, please stand, etc.".

It is conventional for a Base Station or other central (or sub-) intelligence in a TAS network, to keep complete information about every element of the (sub)network and their relationships in a central database (or distributed tables) and to use conventional software on such database, to identify stations of interest and to send messages thereto. US Patent Publication #2002/0019725 A1 (filed by StatSIGNAL Systems, Inc.) is typical. Such software employ SQL commands or Boolean-derived operations applied to a database and other conventional techniques used in database searching or data mining. But these conventional methods use bandwidth inefficiently where, for example, communications are effected through implementing technologies that must be thrifty on processing resources. For example, in a conventional TAS network of a single RF transmitter transmitting to a plurality of receivers, the Base Station must first determine which Stations it wants to disconnect the power at (by, for example, investigating the operating environment), and after determining those 30 Stations, then it must send the instructions to disconnect power, and those instructions must be sent (in sequence, in some implementations) to each such Station, resulting in 30 discrete (yet identical) message payloads. Using the CAS, only one CAS message (with payload) is sent because (1) the identification of the sought stations, and (2) the processing of the payload are all done downstream at each Station upon receipt of the (same, single) CAS message.

The third observation concerns similarities with the IP-based TAS network. In such a network, each network interface is identified by a unique, fixed IP address (typically shown in dotted decimal format), whether static or dynamically assigned, and organized in a hierarchical topology. By a mosaic of masking, filters, routing tables and related mechanisms, a message (whether unicast or multicast) makes its way to the intended station(s).

The similarity of the CAS with the IP broadcast (or token ring broadcast) is apparent only. IP multicast is defined (in RFC 1112) as the transmission of an IP datagram to a host group. Each IP multicast group has a unique class D address, which is used to identify it. Class D addresses range from 224.0 (reserved) to 239.255.255.255. Multicast is based on the concept of a group. Each station must express interest in receiving a particular data stream (by subscribing to be in a multicast group according to Internet Group Management Protocol). Subscribing is done by specifying the class D IP address used for a particular multicast (like tuning to a particular TV channel). The group is arbitrary in the sense that there are no predefined physical or logical connections between group members except for the evincing of interest. But a multicast IP address is really a hierarchical routing address expressing information to help the message "find" its way to its intended destinations. In contrast, the CAS has no like subscription process, and the Contextual Address has no routing information or equivalent helpful information because, among other differences, it is created by the CAS Inquisitee Station upon receipt of the CAS message.

The fourth observations notes that the TAS and the CAS are best contrasted by comparing by analogy, the "where?" of the TAS with the "who?" of the CAS.

The answer to "where?" (a "location question"), is and cannot be other than (directly or indirectly), "it is here" (a "location answer"). The TAS address is akin to a location of an inventory item in a warehouse. The warehouse itself may move, and items within a warehouse may move around relative to each other, but ultimately, the management of the storage and retrieval of items is keyed, directly or indirectly, on their physical locations. Industry has worked hard on improving TAS techniques but fundamentally, the improvements cannot escape their nature as being reductions on the "overhead" steps that (directly or indirectly) recognize that the source station (or its communication proxy) must know (at least some part of) "where" an item is (physically or logically, relative to other physical or logical items).

In contrast, the "who?"-type addressing of the CAS requires (at least) two persons conversing. Identity depends on the person who wants to know (in particular, depends on his viewpoint or interest) and on the person(s) being asked (in particular, depends on their (endogenous and exogenous) personal attributes to together form context). Although "where" may be part of some conversations, a conversation (i.e. a "dialogue" between the two participants) is inherently more powerful than the unilateral reading a static map of locations. By asking "who?" as explained herein, the super-system or complex is advantageously at the cusp of expression and content where the expression of the desired complex action is "part and parcel" with "who". Very efficiently, the message and content are "one", and thereby the conventional concept of "network address" is subsumed.

As a final observation before the main explanation of the preferred embodiment, it is to be noted that it is only the implementing technologies—and not the CAS—that limit the contextually-driven sophistication of Contextual Functions, Variables, Values, Attributes to model (physically, logically and otherwise) the identities to be advantageously sought of CAS Inquisitee Stations.

Preferred Embodiment for a Utility Telemetry Wireless Communication Network

The Traditional and Contextual Addressing Schemes—TAS and CAS—were conceptually explained mainly with the terminology of "Stations" with some references to Network Devices. For the preferred embodiment, terminology that is formative of "Device" is mainly used. One reason is as follows.

The concept of "hearing" requires attention, especially in a wireless embodiment. In conceptually explaining addressing schemes above, "deafness" was defined as follows. A station that cannot hear a CAS message (regardless of why, as long as the deafness was purposeful) is not a CAS Station (i.e. not part of the CAS network) for the purposes of that CAS message, by definition. In contrast, a station is still a TAS Station (i.e. part of the TAS network) in common technical vernacular, even if it does not hear (and cannot hear, in some TAS versions and implementations) a TAS message not addressed to it. A station needs only to be TAS addressable to be a TAS Station and part of the TAS network. For example, if the TAS is an IP hierarchical addressing scheme implemented with routers, then a message to one branch of the hierarchy may mean that it will never be "heard" by stations on another branch. But all such latter stations would still be considered part of the TAS network. The above contrast derives from the different natures of the TAS (where the sender knows "where" to send the message) and CAS (where the sender does not know, and does not care, about "where", and so asks every station to determine if it is a "sought" station).

Furthermore, the "deafness" of a station is implemented in the preferred embodiment by the lack of means to receive RF messages (i.e. has only RF transmission functionality). This choice of implementation not only acknowledges realities in concrete implementations (such as cost considerations) but also simplifies the explanation of the process of "homogenizing" networks (under "Hybrid/Inheritance, below) in that the explanation based on "RF deafness" is applicable without modification to both CAS and TAS networks.

In recognition of the above and to better accomplish the explanation of the preferred embodiment with economy of expression and ease of understanding, the terminology formative of "Devices" is used in the preferred embodiment, with the use of subscripts [ . . . ], so that pertinent distinctions can be made.

Definitions:

The Base Station, WAN Device and LAN Device—the three main Network Devices—were introduced above. Below are amplifications and continuations thereof.

A Base Station is, in principle, no different than any other Network Device, and so, for example, it itself can function as a communication portal/proxy to another network (e.g. to a base station of another network). But it is typically so "large" in its central intelligence and processing logic, with its special responsibilities in the network, its own power sources, etc., that it is awkward in the technical vernacular to call it as if it were a typical Network Device like WAN and LAN Device. And so it is called "Base Station".

Every Network Device has persistent memory (e.g. non-volatile memory such as EEPROM, flash memory, harddisks) which stores information such as Routing Set, Application Set, Routing Depth, PQM messages, Power Outage Count, LAN and WAN Parameters, etc., as those terms are explained below. A Network Device likely has some non-persistent memory (i.e. that requires power to maintain its contents). The term "memory" herein include in its generality, both persistent and non-persistent types of memory, unless there is explicit reference to "persistent memory".

Every Network Device has logic processing functionality (embodied as ASIC, FPGA, PLD, microprocessor for examples), typically collaborating with its memory, to form collectively, its "resident intelligence".

The Network Device in the preferred embodiment is normally powered by a tap of the power line its Interaction Module interacts with. See implementation example of co-pending U.S. application Ser. No. 10/164,394 filed Jun. 10, 2002, entitled, "Adapter for a Meter", which is hereby incorporated in its entirety by reference.

The postscript [Battery Backup] to a Network Device means there is an emergency power source that automatically powers it in case of a power line disturbance. The postscript [non-Battery Backup] means there is no emergency power if the normal power line source fails. At last some functionality is lost by a Network Device [non-Battery Backup] during a power disturbance.

As indicated above, every Network Device is Time Sentient (i.e. has functionality to calculate the passage of time). But it is so only while its clock logic is powered. During a power disruption, only a Network Device [Battery Backup] continues to be Time Sentient. Also, every Network Device time-stamps messages (packets) it sends, based on its Time Sentience (full or limited, as the case may be).

Every Network Device has at least functionality for RF transmission and some have transceiver functionality. The postscript [RF Full] to a Network Device means that it has RF transceiver functionality, whereas the postscript [RF Deaf] means that it has only RF transmit functionality (i.e. cannot receive).

An examplary endpoint in the preferred embodiment is the LAN Device. In its generality, it is the combination of (a) communications functionality in engagement with, at least, (b) an interface a unique source of data or to a unique recipient of data (the latter being a sensor or effector of the Interaction Module). Bearing in mind that one aspect of a "unique" source or recipient of data, is that it is also the "ultimate" source or recipient thereof (hence the term, "endpoint"), and bearing in mind (as John von Neumann observed) that there is no real difference between data to be processed and instructions that do processing (whether the process is to do something or stop from doing something), i.e. an instruction is a particular type of data), then the preceding definition becomes: the combination of (a) communications functionality in engagement with (b) an interface to an ultimate source of data or to an ultimate point of control. The LAN Device in the preferred embodiment for utilities telemetry, is the combination of (a) RF communications functionality in engagement with, at least, (b) an interface to its Interaction Module being a watthour meter that uniquely provides data on electricity consumption on the power line to which it is attached.

In summary, a LAN Device engages its Interaction Module. The Interaction Module interacts with the operating environment of a power grid through its sensor or effector attached to a power line thereof. In the preferred embodiment, the main examples of a sensor and effector are respectively, a voltage sensor and a remote power disconnect switch.

Other Interaction Modules useful in the utilities telemetry setting include tampering sensors (for sensing tilt or detecting inappropriate disturbance of electric fields, magnetic fields, temperature, sound, reverse rotation of a moving element); and effectors such load-shedding devices, utilities distribution equipment (e.g. reclosers, capacitor banks), load control devices, fault indicators, and a variety of other utilities equipment that need (de)activation according to a desired complex action.

The LAN is an RF local area network having a plurality of endpoints, LAN Devices, that communicate with a WAN Device operating as a portal to the WAN and Base Station. There are several types of LAN Devices categorized by their functionality. For simplicity of expression herein, a reference to "LAN Device" simpliciter (i.e. without a square bracketed postscript [ . . . ]) is to LAN Devices generally, i.e. without distinction to any particular functionality but in distinction to non-LAN Devices. The postscripts {[Battery Backup] and [non-Battery Backup]} were explained above. When a LAN Device is postscripted (with {[RF Full], [RF Deaf], [RF Deaf and Dumb], [WAN/LAN Portal Mode], [Application Custodian]}), the following particular functionalities (or limits) are meant.

A LAN Device [RF Full] has full RF transceiver functionality and "is" a "CAS Station" for CAS purposes.

A particular type of LAN Device [RF Full] may have the functionality to collaborate with a WAN Device to form therewith a portal connection between the WAN and LAN. The combination is called "WAN/LAN Device", for economy of expression herein, although reference will be made to the WAN Device and LAN Device as required in explanation. Such a LAN Device [RF Full], when such portal functionality is activated, is said to be in Portal Mode and is then referred to as LAN Device [RF Full] [WAN/LAN Portal Mode]. The combination of WAN Device and LAN Device [RF Full] [WAN/LAN Portal Mode] is sometimes herein called, for simplicity of expression, "WAN/LAN Portal". One implementation of a WAN/LAN Portal (with an optical portal between the WAN Device and LAN Device) is provided in aforementioned co-pending U.S. application Ser. No. 10/164,394.

"Application Set" is the set of "lesser functional" LAN Device(s) [RF Deaf] which are immediately downstream of "fuller functional" LAN Device [RF Full][Application Custodian] (sometimes herein "Application Custodian" for economy of expression) that has "application software" to provide "intelligence" therefor. In effect, the "fuller functional" Application Custodian "takes care" of the lesser Stations by providing "Application Custodian services" thereto. For example, the Application Custodian has functionality for temporarily storing messages received from the LAN Device(s) [RF Deaf] in its Application Set, and for forwarding such messages upstream; for enhancing the quality of Time Sentience of the LAN Device [RF Deaf] under its "care"; "extending" the CAS to cover non-CAS Stations (explained below, including "Hybrid/Inheritance").

The LAN Device [RF Full][Application Custodian] maintains the Traditional Address (i.e. Network ID) of each LAN Device [RF Deaf] in its Application Set.

A LAN Device [RF Deaf] has only RF transmit functionality—it cannot hear RF communications and is not a CAS Station (subject to "participating" in the network explained below in conjunction with a LAN Device [RF Full] [Application Custodian] and "inheritance"). A LAN Device [RF Deaf] can be equipped to receive communications by non-RF means (e.g. a wire or optical port for ascription).

A LAN Device [RF Deaf and Dumb] has no RF functionality and communicates with another Network Device by a non-RF method.

The WAN is a RF wide area network of WAN Devices, which acts as a communication proxy between a Base Station and one or more LAN Devices. For the preferred embodiment, each WAN Device is [RF Full] [Battery Backup] but the postscripts—[RF Full] [Battery Backup]—are not expressed herein for economy of expression. In other embodiments, there might be some WAN Devices which are not as functional (e.g. WAN Device [non-Battery Backup] or WAN Device [RF Deaf]) but in the preferred embodiment, the WAN is meant to operate as a communication proxy between the Base Station and the LAN(s), and so each WAN Device has full communications and other functionality.

Figure 5:
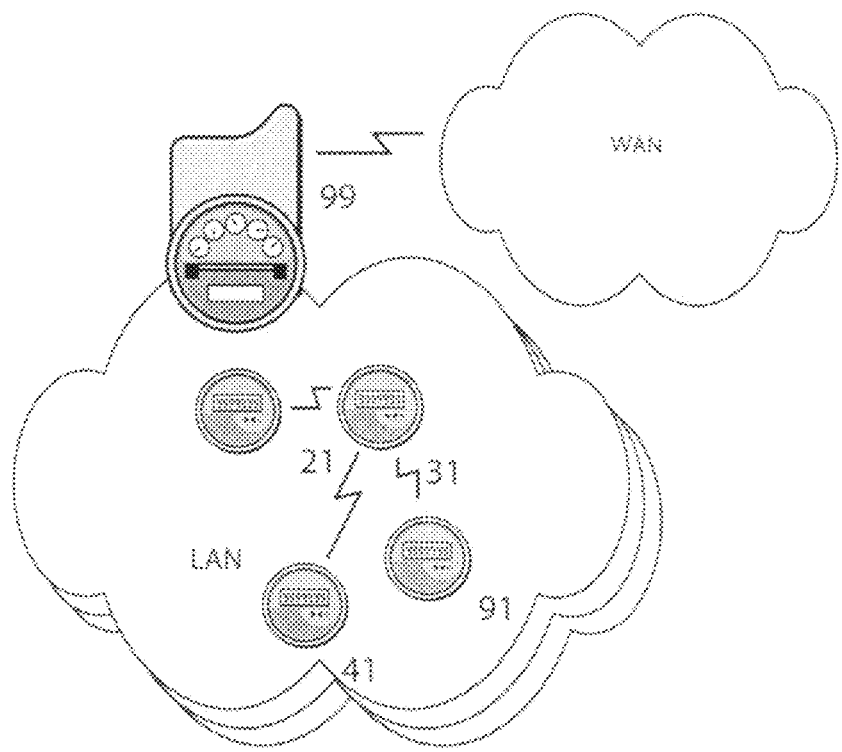
FIG. 5 is an illustration of the Base Station-driven version of Plug & Play process.

A hybrid network is described involving a Base Station engaging with a LAN through the communication proxy of an intermediate WAN therebetween (see FIGS. 4 and 5). The implementations of each of the WAN and LAN depend on the subject marketplace and physical field factors, but choices (and consequent differences) include: the frequency band, communications protocols, government regulations, encryption and compression schemes, modulation techniques, standards bodies, etc.

A preferred embodiment has the WAN operating in the 220 MHz band with a frequency-agile, ultra-narrow band GFSK technology (whose channels are collectively called herein, "WAN Communication Channels"), and the LAN operating in the 433 MHz ISM band with narrow band technology (the channels collectively called herein, "LAN Communication Channels"). A LAN Device (whether [RF Full] or [RF Deaf]) and a WAN Device operates on their, respectively, Operating LAN Communication Channel and Operating WAN Communication Channel. All such Communication Channels are Manufacturer-motivated.

"Business ID" identifies the business with a business interest in a portion of the network (i.e. one or more of the LAN Devices, WAN Devices and Base Station). In the preferred embodiment, the first (incumbent) business is the electricity utility business delivering electricity to its customers, whose sensor-Interaction Module is the aforementioned conventional watthour meter-electro-mechanical-optical-electrical converter combination (with occasional reference to a (second) gas utility business delivering gas to its customers, whose sensor-Interaction Module is a conventional electro-mechanical measurement meter for gas).

A Business ID may appear to be (and obviously can be) "Business-motivated", but for the preferred embodiment, it is Manufacturer-motivated for simplicity of explanation. In other words, in the preferred embodiment, even after the first Business takes possession (and even ownership) of the Network Devices (e.g. the Base Station, a LAN Device to deploy for a customer), the Manufacturer still exclusively controls who can operate on the network (in this case, the first Business).

Alternative embodiments contemplate the Manufacturer selling, leasing or otherwise delegating control of the "Business ID" Contextual Attribute to the first business as a choice of business model employed by them. Once control of the Business ID Contextual Attribute becomes Business-motivated in the hands of the first business, then in turn, this first business can make lease or other commercial arrangements with a second Business for managing their respective business interests in their Network Devices. For example, the first Business can decide to "share" with the second Business, the RF communications functionality, and so they would each have their respective business interest, explained next.

As indicated above, a LAN Device, in the preferred embodiment, is the combination of (a) RF transmission communications functionality in engagement with at least (b) an Interaction Module (being the watthour meter). The first (incumbent electricity utility) Business and the second (gas utility) Business who share a customer, may each have a legal and business interest in the same RF communications functionality, as illustrated in the following example. Suppose the first (incumbent) Business owns its LAN Device (with RF communications functionality) and the right to manipulate the Business ID Contextual Variable. Later, the second Business comes, equipped with its Interaction Module for measuring its customer's gas consumption, that is adapted to engage with that RF communications functionality, and wishes to share it. The first Business leases use of the RF communications functionality to the second Business. The Businesses might share use of the RF communications functionality on an arbitrated or time sharing/scheduled arrangement. For conceptual consistency, a Network ID would be uniquely assigned to each of LAN Device #1 and #2 for TAS purposes, since, according to the general definition of LAN Device, each LAN Device engages an ultimate source of data. LAN Device #1 engages the sensor-Interaction Module for electricity, and LAN Device #2 engages the sensor-Interaction Module for gas.

No limits are imposed on the nature of the business interests. It may be arranged so that any use (single or dual) of the RF communications functionality is under a lease from the Manufacturer (with attendant lease charges for time or services rendered on the network), or the incumbent business leases from the manufacture and in turn subleases to the second business. Alternatives include sale instead of a lease.

The aforementioned embodiments that contemplate two businesses sharing RF functionality, will has corresponding effects on the Base Station functionality, the addressing scheme's handling of multiple Business IDs and the like (explained below).

No limits are imposed on the type of business—for example, a meter provision and management company (i.e. one that provides the metering and not the commodity that is metered). As mentioned above, there are non-utilities settings. For example, a business may be a security alarm company or a (self-serve) vending machine operating company. No limits are imposed on the arrangements among businesses. For example, the Business may, by itself or in collaboration with another, operate one or several Base Stations, one or several WAN Devices, one or several LAN Devices (e.g. the electric and gas utility businesses scenario, above).

Below, explanations and figures are expressed in tabular form only for simplicity of expression herein. There is no connection between CAS and the rows, columns, tables and associated concepts based thereon found in database systems, database techniques, etc. Any apparent similarity between CAS and databases is misleading because basic database concepts are foreign to CAS. For example, as is evident from the above review of Contextual Variables, there is nothing in CAS that understands the concepts of normalizing data to facilitate updating and of denormalizing data to facilitate retrieval.

A CAS message from the inquisitor Base Station has a Contextual Function CF that represents the inquisitor's "viewpoint", with the examplary implementation in tabular 8×8 bit format:

TABLE 1

| | | \multicolumn{7}{c}{Bits number} |
|---|---|---|---|---|---|---|---|---|
| | | 7 | 6 | 5 | 4 | 3 | 2 | 1 | 0 |
| Business ID & Logic | 1 | | PB | | | NOT | | Business ID MSB | |
| | 2 | | | | | Business ID LSB | | | |
| Variable & Logic | 3 | | [AND] | | | NOT1 | | Contextual Variable MSB | |
| | 4 | | | | | Contextual Variable LSB | | | |
| Variable & Logic | 5 | | AND/OR2 | | | NOT2 | | Contextual Variable MSB | |
| | 6 | | | | | Contextual Variable LSB | | | |
| Variable & Logic | 7 | | AND/OR3 | | | NOT3 | | Contextual Variable MSB | |
| | 8 | | | | | Contextual Variable LSB | | | | where {AND/OR} is coded {0/1}, NOT is coded as 1 and otherwise ignored, and PB={1/0} as explained below in conjunction with Propagation Bit.

The above is idealized for ease of comprehension (e.g. some expressions require XOR in implementation).

One {AND/OR} field is blank to implicitly express the [AND] (in recognition that the Business ID of the Base Station and a Station must match), and so the Contextual Function above is the Boolean function of "Business ID AND Contextual Variable 2 AND/OR Contextual Variable 3 AND/OR Contextual Variable 4".

This is a CF2-type of Contextual Function with the values $\{\chi, \psi, \omega\}$ in the above fields for Contextual Variables 2, 3, and 4, such that Contextual Function $(\chi, \psi, \omega)$ represents the sought identity. The Contextual Function is implemented by the resident intelligence of the CAS Inquisitee Station, that interprets parts of the received CAS message to be the Boolean operators to process on the CAS Inquisitee's Contextual Attributes and on $\{\chi, \psi, \omega\}$. In other words, the TABLE 1 implementation of a Contextual Function contemplates the collaborative encounter of the received CAS message (its Contextual Function in particular) and the CAS Inquisitee Station (its resident intelligence in particular). Alternative implementations of a Contextual Function are obviously possible. As mentioned above, the Contextual Function can be embodied completely by the CAS message (CF and payload) which is merely executed by the CAS Inquisitee Station. For another example, the Contextual Function can be also implemented by having the CAS Inquisitee Station store a set of predefined functions, and the CAS message's Contextual Function is simply a choice of function. Regardless of the implementation, the end result is that the CAS Inquisitee Station executes the function chosen or provided by the CAS Inquisitor Station, on its Contextual Attributes to determine its CAS Address/identity.

A typical Network (LAN or WAN) Device has a plurality of Contextual Attributes based on Contextual Variables and Contextual Values therefor. The number and variety of Contextual Variables depends obviously on design choices for potential desired complex actions. Different types of a Station's Contextual Attributes will be discussed next in an examplary way, with reference to tabular format of Contextual Variables:

| CVar1 | CVar2 | CVar3 | CVar4 |
| CVar5 | CVar6 | CVar7 | CVar8 |

CVar 1 identifies the Manufacturer, and Contextual Variables CVar2-CVar4 are the Manufacturer-motivated Contextual Variables or the Station's "Manufacturer Properties", Examplary Manufacture Properties include Device Type, Firmware version, Hardware version. Manufacture Properties are programmed-ascribed.

In contrast to Manufacturer Properties, CVar6-CVar8 are Business-motivated Contextual Variables, and are called the Station's "Business Contextual Variables". Examplary Business Contextual Variables include meter serial #, customer billing plan #, power feeder line #. Ascription of Contextual Values to Business Contextual Variables is done by programming (by Base Station commands or handhelds) or sensing (Interaction Module sensor).

All Contextual Variables (whether Manufacturer Properties or Business Contextual Variables/Values/Attributes), are subject to being Contextually Addressed, although, as noted above, they are manipulable by different parties. A typical Station's Contextual Attributes may allocate the first line to Manufacturer Properties and the second to Business Contextual Variables (holding Contextual Values to form Business Contextual Attributes). Hence,

| Manufacturer | Manufacturer Property 1 | Manufacturer Property 2 | Manufacturer Property 3 |
| Business ID | Business Contextual Variable 1 | Business Contextual Variable 2 | Business Contextual Variable 3 | represented with examplary symbolic Contextual Variables:

| Manufacturer | Device Type | Firmware version | Hardware version |
| Business ID | Meter serial # | billing plan # | power feeder line # |

The Contextual Variables of a CAS Station are initially programmed-ascribed with Contextual Values so that the Station's Manufacturer Properties and Business Contextual Attributes of one CAS Station might begin as:

| ABC Manufacturer | LAN Device [RF Deaf] | 1.2 | 2.3 |
| DEF Electric Utility | 123321AZ | Residential Rate | PL-76B |

The above implementation (TABLE 1) of Contextual Function's Boolean function would "process" on the last three entries of a row of a Station's Contextual Attributes, the first entry being reserved for what is effectively administrative security purposes.

Next are three examplary desired complex actions. They are respectively, sensing, effecting and changing a Contextual Attribute (by providing a new Contextual Value for a Contextual Variable).

The first desired complex action of DEF Electric Utility is to "query the voltage levels of all Stations on power line feeder #75A". This would be implemented by the Base Station sending a CAS message with the following Contextual Function CF, where $\{\chi, \psi, \omega\}$ is $\{0,0,75A\}$, i.e. CF (0,0,75A) represents the sought identity, and the payload is instructions to read and send back the measured voltage levels of all sought Stations.

| | | | Bits number | | | | | |
|---|---|---|---|---|---|---|---|---|
| | | 7 | 6 | 5 | 4 | 3 | 2 | 1 | 0 |
| 1 | Business ID | PB | 1 | | DEF Electric Utility | | | | |
| 2 | & Logic | | | | | | | | |
| 3 | Attribute 1 | | | 0 | | | | | |
| 4 | & Logic | | | | | | | | |
| 5 | Attribute 2 | 0 | 0 | | | | | | |
| 6 | & Logic | | | | | | | | |
| 7 | Attribute 3 | 1 | 0 | | 75A | | | | |
| 8 | & Logic | | | | | | | | |

The second desired complex action is XYZ Electric Utility's, "shut down all Stations on billing plan #7". This would be implemented by the Base Station sending a CAS message with the following Contextual Function CF, where $\{\chi, \psi, \omega\}$ is $\{0,7,0\}$, i.e. CF (0,7,0) represents the sought identity, and the payload is instructions to flip the remote power disconnect switch.

| | | | Bits number | | | | | |
|---|---|---|---|---|---|---|---|---|
| | | 7 | 6 | 5 | 4 | 3 | 2 | 1 | 0 |
| 1 | Business ID | PB | 1 | | XYZ Electric Utility | | | | |
| 2 | & Logic | | | | | | | | |
| 3 | Attribute 1 | | | 0 | | | | | |
| 4 | & Logic | | | | | | | | |
| 5 | Attribute 2 | 1 | 0 | | 7 | | | | |
| 6 | & Logic | | | | | | | | |
| 7 | Attribute 3 | 0 | 0 | | | | | | |
| 8 | & Logic | | | | | | | | |

The third desired complex action is PQR Electric Utility's "all Stations which are on billing plan #A, change to billing plan #B". This would be implemented by the Base Station sending a CAS message with the following Contextual Function CF, where $\{\chi, \psi, \omega\}$ is $\{0,A,0\}$, i.e. CF (0,A,0) represents the sought identity, and the payload being instructions to change the Contextual Attribute of "billing plan" (from #A) to #B.

| | | | Bits number | | | | | |
|---|---|---|---|---|---|---|---|---|
| | | 7 | 6 | 5 | 4 | 3 | 2 | 1 | 0 |
| 1 | Business ID | PB | 1 | | PQR Electric Utility | | | | |
| 2 | & Logic | | | | | | | | |
| 3 | Attribute 1 | | | 1 | | | | | |
| 4 | & Logic | | | | | | | | |
| 5 | Attribute 2 | 1 | 0 | | A | | | | |
| 6 | & Logic | | | | | | | | |
| 7 | Attribute 3 | 0 | 0 | | | | | | |
| 8 | & Logic | | | | | | | | |

The result would be that those Stations (one, more than one or none) that had the sought identities in the three examples above, would respectively, sense, effect and have its Contextual Attribute changed, as described above. For simplicity of explanation, the concept and terminology of CAS Stations were used in these examples—in implementation, these Stations would be LAN Devices (of the communications network) engaging their Interaction Modules having the appropriate sensor or effector and other required infrastructure, as the case may be.

The above is examplary and obviously the CAS can be enriched with more Contextual Variables (Business or Manufactured-motivated). Below are more examples.

| Business ID | Geographical area | Time | Contents of memory location xxx |
| Business ID | Base Station ID | Substation/Feeder | Billing Cycle |

To accommodate Contextual Variables additional to CVar5-CVar8, will require obvious changes to the above implementation of Contextual Function CF and CAS message format.

Above is for a typical Network Device (e.g. LAN Device). The nature and intended role of a Network Device will suggest the appropriate "richness" of its Contextual Variables. A Network Device that operates purely as a communication proxy (e.g. WAN Device) might have fewer Contextual Variables (e.g. those related to Manufacturer Properties for fundamental network infrastructure management purposes).

To continue with the above example of the dual business interests in RF communications functionality, a Network Device may have Contextual Variables which are "business #1-motivated" and others which are "business #2-motivated". For example, there may be RF communications functionality at a residential customer's site that engages an Interaction Module of a meter measuring electricity consumption and an Interaction Module of a meter measuring gas consumption. The gas utility business and the electrical utility business "share" the RF communications functionality as a communication portal for their respective meter Interaction Modules, but for network TAS addressing purposes, each has its own LAN Device [RF Deaf] to engage its respective Interaction Module. Thus in Contextual Attributes, extra lines are completed for the second business:

| ABC Manufacturer | LAN Device [RF Deaf] #1 | 1.2 | 2.0 |
| DEF Electric Utility | 123321 | Residential | 66 volts |
| ABC Manufacturer | LAN Device [RF Deaf] #2 | 1.2 | 2.0 |
| GHI Gas Utility | 223344 | Commercial Time of Use | 123 kJ | with obvious corresponding changes in the Contextual Function CF.

Corresponding to the technical and business situation at the customer's location, the Base Station has a list of Business IDs (DEF Electric and GHI Gas) that it supports. Thus CAS (and Business Contextual Attributes) can support two or more Business IDs to accommodate two customers/owners/lessees.

To prevent "avalanches" in an RF communications network where all messages are RF broadcasted, mechanisms are provided to constrain "avalanches" of CAS messages (being interminably repetitive and useless RF re-broadcasts). Two examples of constraint mechanisms are explained next, Propagation Bit and Routing Depth.

Propagation Bit.

A PB is a propagation bit whose use is explained with examplary fact situations.

Situations where the PB is cleared, include the following.
When the Base Station sends CAS messages on the WAN meant only for the WAN Endpoints (i.e. the messages are not to be RF re-broadcast to the LANs), e.g. sending Network Time to the WAN Devices or commanding a WAN Device to RF broadcast its current time to respective LANs.
When the WAN Device first discovers a LAN Device (in the Plug & Play process, explained below), it RF broadcasts a command (since it does not know the LAN Device), asking it to switch to [WAN/LAN Portal Mode]. When a LAN Device knows it is attached to a WAN Device as part of a WAN/LAN Device, it will send everything to the WAN through the optical port interface in the examplary aforementioned patent application (instead of RF broadcasting over air). This command should be not be RF broadcast to other devices that are not attached to WAN Devices.

Situations where the PB is set, include the following.
When RF broadcasting a command to all devices on the LAN and WAN.

Routing Depth

"Routing Depth" is a measure of the "separation" between a LAN Device and its WAN/LAN Portal to the WAN. For a CAS message, Routing Depth is the number of "levels" of separation. For an upstream TAS message, it is the number of LAN Devices for the message to "hop through" to reach the WAN/LAN Portal.

Each LAN Device has a Routing Depth (determined by its topological position in the Routing Path in its LAN, being the "topological proximity" to the WAN Device, counted in the number of intervening stations). Each message will be identified with the Routing Depth of the station that transmitted it.

When a LAN Device receives a downstream (TAS or CAS) message, it will only RF re-broadcast it if the message's Routing Depth is less than its own, since those messages only propagate properly downstream (away from Base Station/Portal). For example, if a first station whose Routing Depth=6, RF broadcasts a message and a second station whose Routing Depth=7 picks it up and RF re-broadcasts, the first station will receive the RF re-broadcasted message but will be inert to it because the RF re-broadcasted message originates from the second station who is downstream (i.e. second station's Routing Depth is greater than its Routing Depth).

When a station receives an upstream message, the dynamic involving Routing Depth is reversed obviously.

Each downstream message, whether Traditionally or Contextually Addressed, will be acknowledged or passed along (by a RF broadcast) by a station whose Routing Depth is more than that of the downstream message.

Each upstream Traditionally Addressed Message will be acknowledged or passed along upstream (by a RF broadcast) by a station whose Routing Depth is less than that of the upstream message.

Plug & Play

The term, "Plug & Play", colloquially describes the automatic association processes whereby new LAN Devices and WAN Devices are deployed and become participants in the network by automatic detection and self-configuration and with minimum manual effort. In essence, the network, through "Plug & Play" processes, monitors itself and automatically attempts to establish new communication links and to "repair" broken communications links.

A new LAN Device or WAN Device is deployed (by or on behalf of the business) when it is connected by the installer to the relevant Interaction Module in the field—an electric power meter/socket in the preferred embodiment—and is powered up thereby. An implementation example is aforementioned co-pending U.S. application Ser. No. 10/164,394.

As a matter of concept and terminology, a Network Device (a LAN or WAN Device) is "associated" to the network when it is a functioning participant thereof, as recognized by the Base Station. Sometimes herein, as a matter of terminology, a Network Device becomes associated to a component of the network where particularity assists comprehension.

In particular, the Plug & Play processes attempt to associate an un-associated WAN Device to the Base Station; and attempt to associate an un-associated LAN Device (whether [RF Full] or [RF Deaf]) to an (already associated) LAN Device [RF Full] (whether that already associated Device is part of a WAN/LAN Portal operating as a communication proxy to the WAN, or not) and eventually therethrough to the Base Station, so that the Base Station recognizes the un-associated Network Device as a network participant.

Furthermore, there are two main examplary versions of Plug & Play, distinguished by the "residency" of significant portions of intelligence employed to accomplish important aspects of association: (A) "driven by the Base Station" (where significant intelligence resides upstream of an un-associated Network Device, mainly in the Base Station) and (B) "driven by the endpoint" (where, relative to the Base Station driven embodiment, more of the intelligence resides downstream of the Base Station, mainly in the un-associated Network Device). These two versions are not absolute opposites and they differ as a matter of degree depending on which aspects of association are considered more important than others, and where the intelligence therefor is distributed in the network. One examplary important aspect of association is the determination of the Routing Path—who selects for an un-associated LAN Device, the (already associated) LAN Device [RF Full] as its immediately upstream communication proxy or link (to eventually the WAN/LAN Portal), to associate with. If the Base Station selects, the Plug & Play is considered "Base Station driven" and if the un-associated LAN Device selects, the Plug & Play is considered "Endpoint driven". Selection is based on physical communications, topological and resource-related criteria (examples of which are given below).

The choice of "Base Station driven" over "Endpoint driven" or some intermediate version therebetween, presents obvious tradeoffs. For example, the advantage of "Endpoint driven" is that what is essence a local decision, is best decided locally, instead of travelling and bothering the Base Station through other traffic. But a local decision, if too narrowly parameterized, may be unable (out of ignorance) to anticipate a "bottleneck" upstream and so a local decision may worsen regional network performance (that in turn reduces the effectiveness of that local decision).

The Routing Path and other concepts mentioned above, are explained below. After introducing definitions common to both association versions of "Base Station driven" and "Endpoint driven", each version will be explained for associating an un-associated (1) WAN Device, (2) LAN Device [RF Full] and (3) LAN Device [RF Deaf].

Definitions

"Network ID" is the unique identifier of an interface to the non-CAS aspects of the network—it is the address used for Traditional Addressed (i.e. SOURCE or DESTINATION in FIG. 1) messages. A Network ID is Manufacturer-motivated and uniquely assigned to every Network Device (whether LAN or WAN Device or Base Station) and resides in its persistent memory. The Network ID assigned to the Base Station is called "Base Station ID" for ease of comprehension.

A WAN Device leaves the Manufacturer with its unique Network ID, the Business ID(s) its supports, and its list of WAN Communication Channels to scan on and other WAN Parameters.

A LAN Device leaves the Manufacturer with its unique Network ID, the Business ID(s) its supports, and its list of LAN Communication Channels to scan on, and other LAN Parameters. In the case where two (or more) Business ID are supported, it may be that there is a single physical device in implementation but for purposes of this invention's network, there would conceptually be two (or more) LAN Devices.

"Association Beacon" is a message broadcast with the objective of "finding" un-associated Network Devices to start the Plug & Play process. The Base Station periodically broadcasts a WAN Association Beacon to "find" un-associated WAN Devices, and a LAN Device [RF Full] periodically broadcasts a LAN Association Beacon to "find" un-associated LAN Devices.

The WAN Association Beacon from a WAN Device includes the following information: its supported Business ID(s) and its Operating WAN Communication Channel, with a list of time slots during which a WAN Association Request can be sent by an un-associated WAN Device in response to a WAN Association Beacon. The number and duration of time slots can be dynamically adjusted (locally, regionally or by the Base Station on a network wide basis), based on, for example, recent past experience as function of traffic levels, dropped communications and the like.

The LAN Association Beacon from a LAN Device [RF Full] (regardless of whether it has or not, the functionality to collaborate with a WAN Device to form a WAN/LAN portal) includes the following information: Network ID, Operating LAN Communication Channel, supported Business ID(s), Resource Indicator, Routing Depth, Base Station ID and Network Time. An un-associated LAN Device's response to a LAN Association Beacon, is a LAN Association Request, which has the Device's Network ID, Manufacturer Properties and Business Contextual Attributes.

The received "Signal Quality" of a Communication Channel is a metric of a message(s) received thereon, that depends on Bit Strength Indicator (BSI), Received Signal Strength Indicator (RSSI), and/or other physical communication aspects of the message. The received Signal Quality is measured, calculated and maintained by the Network Device receiving the message.

"Acceptable Signal Quality" (and components, such as "Acceptable RSSI" and "Acceptable BSI") are each Manufacturer-motivated thresholds against which received Signal Quality of a message is compared in the decision-making in Plug & Play processes.

"Resource Indicator" is a metric kept by a Network Device, about how busy it is (e.g., a function of the size of its Application Set, Routing Set, (historical) traffic, etc.) or equivalently, for purpose of Plug & Play, how much more communications traffic and processing it can handle. The "Acceptable Resource Indicator" is a Manufacturer-motivated threshold for a Network Device.

"Routing Depth", as introduced earlier, is the # of Devices (or levels, "hops" or equivalents) from a LAN Device to its WAN/LAN Portal. A LAN Device [RF Deaf] has its Routing Depth set at a large number (e.g. 15) to represent it inherent inability to receive messages. An un-associated LAN Device [RF Full] has its Routing Depth initially set at zero and is then changed during the Plug & Play process, explained below.

But, in particular, a LAN Device that is part of a WAN/LAN Portal starts with, and remains fixed at, a Routing Depth of zero.

"Routing Set" of a Network Device (typically a WAN Device or LAN Device [RF Full]) is the set of all downstream LAN Devices (whether immediately downstream or not) to which a received Traditional Message is to be forwarded. Such a downstream LAN Device may be [RF Deaf] in the following situation. If it is a member of the Application Set of a LAN Device [RF Full][Application Custodian], then it is also a member of the former's Routing Set for the following reason. Although the LAN Device [RF Deaf] itself cannot receive any messages, its LAN Device [RF Full] [Application Custodian] can receive "on its behalf" (as explained at "Hybrid/Inheritance" below). Generally, there is no necessary identity between the Routing Set of a LAN Device [RF Full][Application Custodian] and its Application Set.

"Routing Path" of a LAN Device [RF Full] (or WAN Device or Base Station) is the constructed sequence of downstream Network Device(s) to which it will forward a Traditional Message. A downstream Network Device can be identified with a Business-motivated identifier (e.g. Business Contextual Attribute of meter serial #) or a Manufacturer-motivated identifier (e.g. Network ID) but regardless of the means of identification, the Routing Path is used only for Traditional Messaging and does not form part of the CAS. As elaborated below, the sequence is constructed for a given downstream LAN Device, by identifying the "best" immediately upstream LAN Device [RF Full], where "best" is determined by examplary criteria such as physical communications qualities (such as Signal Quality), topological efficiency characteristics (such as Routing Depth) and other criteria to minimize the burden on the network generally or regionally (the (immediate or otherwise) upstream LAN Devices [RF Full] as reflected in their Resource Indicators), such criteria based on historical experience or projected values or both, constrained only by implementation technologies. In the examplary explanations below, the "best" is sometimes, for ease of explanation only, simplified to involving one or two of the preceding criteria.

A typical Routing Path is <Base Station, WAN Device, LAN Device [RF Full] [WAN/LAN Portal Mode], LAN Device [RF Full] (best), LAN Device [RF Full] (best)], LAN Device [RF Deaf]>.

The Base Station keeps a copy of all constructed Routing Paths (i.e. the Routing Path of each applicable Network Device) or the information necessary to create them (e.g. keeps the Routing Sets of each Network Device and the Routing Depth of each Device therein). This information is used to update Device's Routing Set, to perform diagnostics, etc. The Base Station also keeps Routing_Candidates for a version of Self-healing (explained below).

"Power Outage" is a power disturbance that lasts longer than a (Business-motivated) period, "Power Outage Period", and that prompts the subject Device to send a "Power Outage Message" to the Base Station. A Power Outage can obviously only be detected by a LAN Device [Battery Backup] because the Network Device's clock logic needs to be powered to so measure. A LAN Device [non-Battery Backup] cannot calculate the passage of time during a power disturbance. Power Outages are mainly discussed in PQM/AMR below, but are introduced here because of their role in the "Self-healing" aspects of Plug and Play (i.e. after a Power Outage).

Examplary LAN Parameters Include:
a) Beacon Interval (the period of the LAN Device's periodic broadcasting of a LAN Association Beacon, between 1 and 255 minutes, with 0 to disable)
b) Installation Timeout (maximum time that an un-associated LAN Device will wait after it sends its LAN Association Request, for an appropriate response, between 1 and 255 minutes, with 0 to disable)
c) Ordinary Re-association Timeout (if no Power Outage Message is detected, maximum time to spend to re-associate, between 1 and 255 hours, with 0 to disable)
d) Serious Re-association Timeout (in case of a serious problem, i.e. if Power Outage Message is detected, the maximum time to spend to re-associate, in hours, with 0 to disable, and the duration will be much larger than Ordinary Re-association Timeout).
e) Acceptable Signal Quality and Acceptable Resource Indicator Examplary WAN Parameters Include:
a) WAN Communication Channels to scan on; and
b) parameters related to (e.g. the period of) Base Station maintenance schedule for adjusting RF frequencies in case of drift (if compelled by RF regulatory considerations).

WAN and LAN Parameters are typically Manufacturer-motivated but can be rendered Business-motivated (with a suitable arrangement with a sophisticated business).

Through a sequence of expected engagements (operating from the OSI physical layer upwards, including those related to modulation scheme, frequency band, timing, and other conventional techniques), each message sent in the network is in effect "signed" by conventional means, with a "monogram" or "signature" that identifies it as originating from that network, so that stations belonging to that network will recognize it as one of its "own" and will continue to process. For the preferred embodiment, this "signature" is termed adjectively herein as Network Signed Packets (to distinguish from other networks operating on other communication protocols).

I. Base Station Driven Plug & Play

This version has three main processes: (1) deploy WAN/LAN Device, (2) deploy LAN Device [RF Full], and (3) deploy LAN Device [RF Deaf]. These will be explained in turn, followed by an example.

(1) Deploy WAN/LAN Device
1. WAN Device's Network is ID enrolled at Base Station by the business.
2. The Base Station periodically broadcasts a WAN Association Beacon.
3. When the WAN/LAN Device is deployed, the WAN Device will scan its list of WAN Communication Channels for signals having at least Acceptable RSSI and among those Channels, the presence of Network Signed Packets. On the first such Channel, the un-associated WAN Device, for a (programmable) time, will listen for a WAN Association Beacon having its (the WAN Device's) Business ID. If it does not timely hear such a WAN Association Beacon, it tries the next such Channel. If there are no more such Channels, it restarts the aforementioned scanning. When the WAN Device hears a WAN Association Beacon, it sends a WAN Association Request message to the Base Station (in one of the time slots offered in such WAN Association Beacon).
4. In parallel with the process of step 3, the WAN Device queries its LAN Device to determine if it is in [Portal Mode] (the LAN Device always leaves that mode after a power disturbance). If the LAN Device is not in [Portal Mode], the WAN Device sends a "set Portal Mode" command, and the LAN Device responsively goes into [Portal Mode] (i.e. becomes a LAN Device [RF Full] [WAN/LAN Portal Mode]) and returns a LAN Association Request message to the WAN Device, that in turn relays to the Base Station.

5. When the Base Station receives the WAN Association Request from an enrolled but yet un-associated WAN Device, it will query that WAN Device's Manufacturer Properties, and then it will add the Base Station ID to the WAN Device's Contextual Attributes.
6. When the Base Station becomes aware of the LAN Device (through the LAN Association Request), it will:
    a) query it to get its Manufacturer Properties;
    b) add the Base Station ID to its Contextual Attributes;
    c) set its other Business Contextual Attributes;
    d) set its AMR Parameters and PQM Parameters (explained below);
    e) set its Routing Depth to zero.

The (up to then) un-associated WAN/LAN Device is now associated to the network, and can be considered an operational WAN/LAN Portal.

This (just associated) LAN Device [RF Full] [WAN/LAN Portal Mode], on its Operating LAN Communication Channel, periodically broadcasts its LAN Association Beacon "looking" for un-associated LAN Devices in the field, inviting the Plug & Play process to begin again therefor.

If this LAN Device [RF Full] [WAN/LAN Portal Mode] is unable to forward upstream messages it receives, to the WAN Device after exhausting (a programmed number of) retries, it will stop sending LAN Association Beacons and will no longer acknowledge any messages/packets it receives.

(2) Deploy LAN Device [RF Full] (by Itself and not Part of a Wan/LAN Device)
1. The LAN Device [RF Full] is deployed and determines whether it has not been previously associated (e.g. it has no Base Station ID value in its Contextual Attributes that would have been the result of a previous association).
2. If the LAN Device [RF Full] has not been previously associated, it listens for its Beacon Interval and records in a list those LAN Association Beacons it hears that meet the following criteria (the list is considered complete when at least one qualifying message has been received and the Beacon Interval has expired):
    a) the received Signal Quality is greater than the Acceptable Signal Quality; and
    b) the LAN Device [RF Full]'s Business ID is among the LAN Association Beacon's list of supported Business IDs.
3. If the LAN Device [RF Full] had been previously associated and it finds in the list of Association Beacons, a LAN Device [RF Full] that was previously its immediate ancestor (i.e. its immediately upstream) communication proxy, it will select to maintain it and continue normal operation, and proceed to post-Plug & Play processes below.
4. The LAN Device [RF Full] selects the best candidate from the list of LAN Association Beacons it has received, based on the following sequential factors:
    a) the lowest Routing Depth; and
    b) if Routing Depth are equal, the best received Signal Quality;
5. The LAN Device [RF Full] sends an Immediate_Proxy_Found Message (after changing the source ADDRESS of that upstream TAS message to be the Network ID of the selected candidate), on that selected candidate's Operating LAN Communication Channel.
6. The selected candidate, upon receiving the Immediate_Proxy_Found Message, augments it by adding its received Signal Quality thereto, and forwards it to the Base Station (i.e. the received Immediate_Proxy_Found Message is modified to include received Signal Quality measurements by the selected candidate and the LAN Device [RF Full]). Once the LAN Device [RF Full] has selected a candidate, it can learn the Network Time from the candidate's Association Beacons and coordinate its Time Sentience accordingly.
7. When the Base Station receives the augmented Immediate_Proxy Found message for a LAN Device [RF Full], it will determine the Routing Path according to its criteria, which may include factors beyond those considered in step 2 above. It considers the augmented Immediate_Proxy_Found message and the information contained therein but is not compelled to accept the candidate selected. Upon determining the Routing Path, it will then send a Routing Set_Add message to each Device in the Routing Path to establish a Routing Path to the LAN Device [RF Full] (these messages will be sent one at a time, waiting for each Device to respond, working from the top of the Routing Path downstreamwardly). If the LAN Device [RF Full] is already known to the Base Station (because of a previous association), the Base Station will first do some "housekeeping", as follows. It will delete the previous Routing Path by sending a Routing Set_Delete Message to each Device therein, before establishing the new Routing Path (deletions are done upstreamwardly from the bottom of the Routing Path, waiting for each Device to respond in turn). An empty Routing Set_Add Message is then sent to the LAN Device [RF Full] to clear its Routing Set, effectively cutting off any sub-tree, forcing every subordinate Device to re-associate by starting its respective individual Plug & Play process.
8. The Base Station performs the following with the LAN Device [RF Full]:
    a) add the Base Station ID to its Contextual Attributes
    b) query its Contextual Attributes to get its Manufacturer Properties
    c) set its other Business Contextual Attributes
    d) set AMR Parameters and PQM Parameters (explained below)
    e) set its Routing Depth to zero
    f) verify/set its correct Routing Depth for its inserted location in the Routing Path.

The LAN Device [RF Full] is now associated.
9. If the LAN Device [RF Full] does not receive a Base Station ID or some other appropriate response within its Installation Timeout from its sending of the Immediate_Proxy_Found message, it will delete the selected candidate from its list, and continue with step 4 above. If the list is empty, it will continue with step 2 above.

Once the LAN Device [RF Full] has received the Base Station ID, and if its Routing Depth is less than 15, it will start periodically broadcasting its LAN Association Beacon (Devices at maximum Routing Depth may not route messages), "looking" for un-associated LAN Devices in the field.

If this LAN Device [RF Full] [WAN/LAN Portal Mode] is unable to send upstream messages or forward upstream messages it receives, after exhausting (a programmed number of) retries, it will stop sending LAN Association Beacons and it will no longer acknowledge any packets it receives. The LAN Device [RF Full] continues to resend the message until an Ordinary Re-association Timeout has expired, at which time it will consider itself to be no longer associated and will start the association process over with step 2. If the LAN Device [RF Full] retries to send its upstream packet and succeeds before the Ordinary Re-association Timeout has expired, it will continue operating as normal. Any failed messages are kept by the LAN Device [RF Full] (and handled according to "Lost Messages" below).

When the LAN Device wakes up upon power resumption, it assumes that it is still associated. When it becomes aware that it is not, and if it woke on a power resumption following a Power Outage, then it will perform its Plug & Play process using the Serious Re-association Timeout.

(3) Deploy a LAN Device [RF Deaf]

The Routing Depth of a LAN Device [RF Deaf] is Manufacturer-motivated to be large # (15, for example) to signify that it should not try to relay messages as a communication proxy because it is too remote from the WAN/LAN Portal.

1. The LAN Device [RF Deaf] is deployed.
2. The LAN Device [RF Deaf] sends a Reporting_In Message, which includes its Network ID, Manufacturer Properties and Business ID, and is repeated as follows ("Reporting_In Schedule"):
   a) Immediately on start-up;
   b) Every 5 minutes for the first hour;
   c) Every hour for the first day;
   d) Once a day thereafter.
3. Every associated LAN Device [RF Full] that hears a Reporting_In Message with a Business ID that is the same as its Business ID, will send a Routing_Candidate Message to the Base Station that includes:
   a) its Network ID, Business ID and Manufacturer Properties;
   b) the RSSI observed while receiving the Reporting_In Message;
   c) the BSI observed while receiving the Reporting_In Message.
4. When the Base Station receives a Routing_Candidate Message from an LAN Device [RF Full] for a LAN Device [RF Deaf], it will wait for a period (programmable) to see if any other Routing_Candidate Messages are received for the same LAN Device [Deaf]. After this wait, the Base Station will select among the candidate LAN Devices [RF Full], the best one to "assign" to the LAN Device [RF Deaf] as its immediately upstream communication proxy, according to the ordered criteria:
   a) Best RSSI over Acceptable RSSI (if none, an error will be displayed and the Device will not be associated);
   b) RSSI being equal, select the one with best BSI;
   c) the preceding being equal, select the one with lowest Routing Depth;
   d) the preceding being equal, select the one with smallest Routing Set.
5. Once selected, the Base Station constructs the Routing Path to the LAN Device [RF Deaf] and will instruct each LAN Device [RF Full] in the Routing Path to the LAN Device [RF Deaf]) to add to its Routing Set, the LAN Device [RF Deaf]'s Network ID.
6. The selected LAN Device [RF Full] is instructed by the Base Station to add to its Application Set, the Network ID of the LAN Device [RF Deaf]. i.e. make the selected LAN Device [RF Full] to be the Application Custodian of the LAN Device [RF Deaf]s.
7. The LAN Device [RF Deaf] will send an AMR Information Report according to "Reporting_In Schedule", which will be passed upstream by its Application Custodian.

The LAN Device [RF Deaf] is now associated.

The Base Station is made to create sufficient density of interactive communications (i.e. the number of messages it sends over a period of time, for which it is expecting timely responses), that it will detect when something is wrong with any particular LAN Device [RF Full] or WAN Device. Accordingly, there is no need for such Devices to "report in" to the Base. Station. In contrast, the Reporting_In Message and the Reporting_In Schedule are necessary for the LAN Device [RF Deaf] because the Base Station needs to know whether it is still participating in the network.

It is noted that step 4 is based on purely RF communications performance. Alternatively, there can be hybrid criteria, e.g. after an Acceptable RSSI, the Base Station decides based on factors other than pure RF performance.

Example of Base Station Driven Plug & Play

An example will be explained in conjunction with FIG. 5. Each Network Device (WAN Device, LAN Device) has Contextual Attributes which, in tabular format, has a first row of Manufacturer Properties, and a second row of Business Contextual Attributes.

LAN/WAN Device starts with a blank Routing Set
LAN Device [RF Full] starts with a blank Application Set
LAN Device [RF Deaf] has no Application Set

* * *

For a WAN Device, with Network ID=#99, its Business Contextual Attributes and Manufacturer Properties are initialized with values for:

| 1 | Device Type | Firmware version | Hardware version |
|---|---|---|---|
| 2 | Base Station ID | 0 | 0 |

* * *

For (first) LAN Device (physically) attached to WAN Device #99:

LAN Device [RF Full] (Network ID=#21)
Starts with Contextual Attributes of:

| 1 Business ID | Device Type Attribute 1 | Firmware version Attribute 2 | Hardware version Attribute 3 |
|---|---|---|---|

Its Routing Depth is set to be zero (i.e. it is at the same level as WAN Device #99)
Its Routing Set and Application Set start blank.
Upon LAN Device #21 (through optical interface of WAN Device #99) identifying itself to the Base Station with its Contextual Attributes and being authenticated by Base Station, then:
Base Station adds an extra line to Contextual Attributes of LAN Device #21:

| 2 | Base Station ID | 0 | 0 |
|---|---|---|---|

The Routing Set of WAN Device #99, has #21 entered by Base Station.

* * *

For (another) LAN Device [RF Full] communicating with LAN Device #21:
LAN Device [RF Full] (Network ID=#31)
Starts with Contextual Attributes of LAN Device #31 for:

| 1 Business ID | Device Type Attribute 1 | Firmware version Attribute 2 | Hardware version Attribute 3 |
|---|---|---|---|

Its Routing Depth is set to be one (i.e. one level below WAN Device #99)
Its Routing Set and Application Set start blank
Upon LAN Device #31 (to LAN Device #21 and then via WAN Device #99) identifying itself to the Base Station with its Contextual Attributes and being authenticated by Base Station, then Base Station adds an extra line to those Contextual Attributes:

| | Base Station ID | 0 | 0 |
|---|---|---|---|

The Routing Set of LAN Device #21 and #99 both have #31 entered by Base Station.
LAN Device #31 is a LAN Device [RF Full] [Application Custodian].
* * *
For LAN Device [RF Deaf] #91
Routing Depth is set at 15
Starts with Business Contextual Attributes for:

| 1 Business ID | Device Type Attribute 1 | Firmware version Attribute 2 | Hardware version Attribute 3 |
|---|---|---|---|

The Application Set of LAN Device #31, has #91 entered by Base Station
The Routing Set of WAN Device #99, has #91 entered by Base Station.
The Routing Set of LAN Device #31, has #91 entered by Base Station.
* * *
For (another) LAN Device [RF Deaf] #41
Starts with Contextual Attributes for:

| 1 Business ID | Device Type Attribute 1 | Firmware version Attribute 2 | Hardware version Attribute 3 |
|---|---|---|---|

Its Routing Depth is set to be 2 (i.e. it is two levels below WAN Device)
It has neither Routing Set nor Application Set (being a LAN Device [RF Deaf])
Upon LAN Device #41 sending a message to Base Station (via LAN and then WAN), and identifying itself with its Contextual Attributes, and being authenticated by Base Station, then Base Station adds an extra line to its Contextual Attributes:

| 2 | Base Station ID | 0 | 0 |
|---|---|---|---|

The Base Station decides (based on physical and logical criteria) to attach LAN Device #41 to LAN Device #31 (instead of LAN Device #21).
The Routing Set of LAN Device [Application Custodian] #31, LAN Device #21 and WAN Device #99 each have #41 entered therein by Base Station.

II. Endpoint Driven Plug & Play

Figure 6:
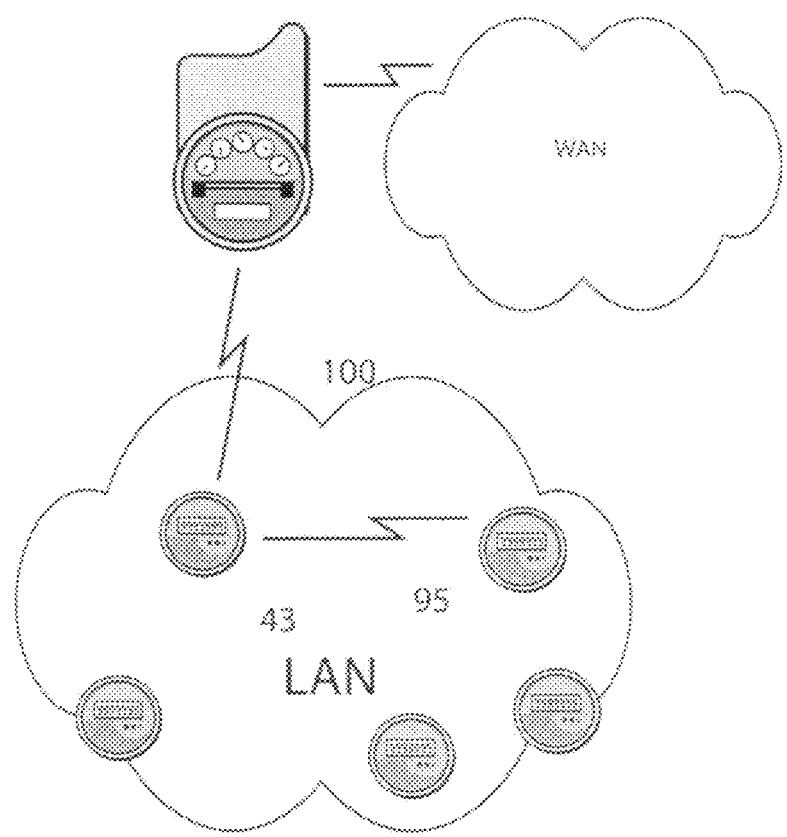
FIG. 6 is an illustration of the endpoint-driven version of Plug & Play process.

This version has three main processes: (1) deploy WAN/LAN Device, (2) deploy LAN Device [RF Full], and (3) deploy LAN Device [RF Deaf]. These will be explained in turn, followed by an example (with FIG. 6). As indicated above, the main examplary difference between the "Endpoint driven" version and the above "Base Station driven" version, is the location of the intelligence that decides the Routing Path. Because the remaining aspects and mechanics are the same, below is an abbreviated summary of the three main processes because of their near identity to the processes of "Base Station driven" Plug & Play.

Base Station periodically sends a WAN Association Beacon "looking" for un-associated WAN Devices.
(1) Deploy WAN/LAN Device
1. When the WAN Device is deployed, it scans its listed WAN Communication Channels for a message that is (or has) Network Signed Packets, develops a short list of such channels, chooses a channel based on best received Signal Quality (and other criteria) and returns a WAN Association Request message.
2. The WAN Device determines (through its optical port, in the examplary aforementioned U.S. application Ser. No. 10/164,394) its LAN Device and upon receiving an appropriate response, it puts the LAN Device into Portal Mode, i.e. to become a LAN Device [RF Full] [WAN/LAN Portal Mode]. Then the LAN Device sends a LAN Association Request message to the WAN Device, that is relayed to Base Station.
3. After association with Base Station, the LAN Device periodically sends a LAN Association Beacon and listens for a LAN Association Request reply from any un-associated LAN Devices.
(2) Deploy LAN Device [RF Full] (by Itself and not Part of a WAN/LAN Device).
During its Beacon Interval, the LAN Device listens for LAN Association Beacons that have a matching Business ID, and then those that have at least the Acceptable Signal Quality and Acceptable Resource Indicator. Among such candidates, the LAN Device selects the best (as a function of received Signal Quality, Resource Indicator, lowest Routing Depth) to be its immediately upstream proxy, and will send its LAN Association Request on the Operating LAN Communication Channel of that selected LAN Device. That selected LAN Device's Network ID will be the source address of the LAN Association Request.
(3) Deploy LAN Device [RF Deaf]
The process can the same as for the Base Station driven Plug & Play, above.
Example of Endpoint Driven Plug & Play.
An example will be explained in conjunction with FIG. 6. Each Network Device (WAN Device, LAN Device) has Contextual Attributes which, in tabular format, has a first row of Manufacturer Properties, and a second row of Business Contextual Attributes
LAN/WAN Device starts with a blank Routing Set.
LAN Device [RF Full] starts with a blank Application Set.
LAN Device [RF Deaf] has no Application Set
* * *
The Base Station has a list of supported Business IDs and broadcasts periodically a WAN Association Beacon with a list of empty time slots.
A WAN Device leaves the Manufacturer with Network ID=#100, a list of WAN
Communication Channels, and its Contextual Attributes initialized with Contextual Values for:

| 1 | Device Type | Firmware version | Hardware version |
|---|---|---|---|
| 2 | Base Station ID | 0 | 0 |

Its Routing Set starts blank
When WAN Device #100 is deployed, it scans its listed WAN Communication Channels for those that have the WAN Association Beacon messages and then selects the best one based on Signal Quality (and other factors) to return a WAN Association Request.

Upon receipt by the Base Station, WAN Device #100 is associated.

\* \* \*

For (first) LAN Device that is part of WAN/LAN Device:
LAN Device [RF Full] [WAN/LAN Portal Mode] (Network ID=#43)
Starts with Business Contextual Attributes of LAN Device #43

| 1 Business ID | Device Type Attribute 1 | Firmware version Attribute 2 | Hardware version Attribute 3 |
|---|---|---|---|

Its Routing Depth starts at zero (i.e. it is at the same level as WAN Device)
Its Routing Set and Application Set start blank
Upon LAN Device #43 (through optical interface of WAN Device) identifying itself to the Base Station with its Contextual Attributes and being authenticated by Base Station, Base Station adds an extra line to Contextual Attributes of LAN Device #43:

| 2 | Base Station ID | 0 | 0 |
|---|---|---|---|

The Routing Set of WAN Device #100 has #43 entered by Base Station.
LAN Device periodically sends LAN Association Beacon for un-associated LAN Devices.

\* \* \*

For (another) LAN Device [RF Full] #95
LAN Device [RF Full] (Network ID=#95)
Starts with Business Contextual Attributes of LAN Device #95

| 1 Business ID | Device Type Attribute 1 | Firmware version Attribute 2 | Hardware version Attribute 3 |
|---|---|---|---|

Its Routing Depth is set at one (i.e. one level below WAN Device).
Its Routing Set and Application Set start blank.

Upon receipt of a LAN Association Beacon, it responds with a LAN Association Request message, wherein it has inserted in the ADDRESS field of that upstream TAS message, the Traditional Address of LAN Device #43. Upon LAN Device #43's receipt of LAN Association Request, it notes the LAN Association Request's Network ID and puts it in its Routing Set, and passes the LAN Association Request to WAN Device #100, which updates is Routing Set to include LAN Device #95, and then upstream to Base Station. When Base Station receives it, it notices that that Network ID is new, and so it updates its Routing Set to include LAN Device #95.

Upon LAN Device #95 (via LAN Device #43 and then WAN Device #100), identifying itself to the Base Station with its Contextual Attributes and being authenticated by Base Station, the Base Station adds an extra line to those Contextual Attributes:

| Base Station ID | 0 | 0 |
|---|---|---|

As indicated above, the difference between the above two versions of Plug & Play is one of degree.

For example, in the "Base Station driven" version for a LAN Device [RF Full] (by itself and not part of a WAN/LAN Device), extra criteria can be added to the local selection process that would make it more cognizant of factors beyond mere immediate physical communication qualities. For example, additional 2 c) "the Resource Indicator larger than Acceptable Resource Indicator", and additional 4 c) "if Received Signal Quality are equal, select the one with the best Resource Indicator", would further distinguish among various LAN Association Beacons. These extra criteria would allow the Base Station to "relax" its decision making responsibilities because the new LAN Device would be making more "regional" selections based on topological or other factors beyond (its immediate) physical communications quality.

For another example, although the above explained a Base Station driven process for an un-associated LAN Device [RF Deaf] (i.e. candidates are provided to the Base Station to select from), that process can be also employed for an un-associated LAN Device [RF Full].

Lost Messages.

When a LAN Device [RF Full] considers its (downstream or upstream) message to be lost, it will send a Failed_Message Report to the Base Station.

That Report has the following information related to the lost message/packet including: (upstream/downstream) direction, sequence number, type, size, source or destination ID, followed by the (encapsulated) entire (lost) message of which the lost packet was part. If the entire (lost) message cannot fit in a single Failed_Message Report, then a sequence of Failed_Message Reports is sent to the Base Station, each carrying a part of the lost message.

The Base Station, upon receipt of the Failed_Message Report(s), will reconstruct the original lost message, record it in a RF Packet Log and note the error in its system log. If the message was lost going upstream, it will be routed to the appropriate Base Station application as a normal message for processing. If the message was lost downstream, it is routed as a lost message to the appropriate Base Station application. If the device is not listed as one having sent a Power Outage Message, or marked as "missing in action" (or any of the devices in its Routing Path), the Base Station will verify the Routing Path to the intended recipient by confirming the routing information at each step (e.g. querying each Station for its status and waiting for its response). If a LAN Device cannot be reached, it is marked as "missing in action" and the Base Station will simply wait for it to timeout and re-associate (or re-power after a Blink). As soon as any message is received from that LAN Device, its "missing in action" status is removed.

The Base Station application will not permit downstream messages to Network Devices that are "missing in action" or are experiencing a Power Outage (i.e. sent a Power Outage Message which has not been cancelled). This will also be extended to the existing Routing Path (i.e. if an upstream LAN Device in the destination device's Routing Path is "missing in action" or experiencing a Power Outage).

The preceding explanation applies to Traditionally Addressed Messages but is not restricted thereto. Losses of Contextually Addressed Messages can also be recognized.

For a given CAS message, the Base Station knows the total number of CAS Inquisitee Stations (i.e. the total number of LAN Devices [RF Full]) and, depending on the total number of LAN Device responses received, can infer that one or more CAS messages were lost.

Self-healing

As an example of a desired complex action responsive to the dynamic operating environment, the network heals itself when a communications link is broken, as follows.

(A) Base Station Driven

The Base Station maintains a list of all Routing_Candidate Messages as alternative routing possibilities.

When it determines that a LAN Device [RF Deaf] is no longer reporting (e.g. a LAN Device [RF Deaf]'s Reporting_In Message is not timely received), it deletes the then current Routing Path to that non-reporting LAN Device [RF Deaf] and tries to establish a new Routing Path using the best combination from that list.

As indicated above, the Base Station is made to create sufficient density of interactive communications, that it will detect when something is wrong with any particular LAN Device [RF Full] or WAN Device. As indicated above, the LAN Device [RF Full] can be associated by a Routing_Candidate process. When the Base Station detects a problem with a particular LAN Device [RF Full], it can revisit its list of Routing Candidate Messages and tries to establish a new Routing Path using the best combination from that list.

If a new Routing Path cannot be established, an error message is generated to require manual intervention.

(B) Endpoint Driven

When a LAN Device or WAN Device becomes un-associated (i.e. loses communications link with its upstream entities because of lack of acknowledgements to the messages it sends), it restarts the process of Plug & Play explained above, wherein the concepts of a "new" Device being "deployed" are replaced with a Device that is no longer associated.

Unless the failure in the upstream communications link was due to causes unrelated to communications capability, there is no difference (from the viewpoint of a Network Device and of the Base Station in respect of potential network participation) between such a new, un-associated Network Device and a previously associated but now, un-associated Network Device. For such an un-associated Network Device, self-healing and the Plug & Play process are synonymous. Common causes of un-association include a degradation of the RF communications quality to the point of "orphaning" a Network Device, due to operating environment changes (e.g. foliage growth or a transient, adverse weather conditions) or transient or intermittent failures in the implementation technologies, and the like. Un-association that prompts self-healing herein does not include breaks in the communications link due to causes unrelated to communications capability, such as, for example, a severe mechanical or electrical failure in a Network Device that renders it useless without manual intervention and repair. Thus un-association in the presence of Power Outage Messages, is not considered by the mere fact of a Power Outage, to be a situation that requires self-healing. So when a Network Device "wakes up" after a power disturbance, it will assume that it is still associated until it determines otherwise.

Recovery

In case of a serious power disturbance, it is advantageous to recover upon power resumption, as much of the state of the network as possible.

As explained above, the Network Device time-stamps all messages to be sent, with its Relative Time or with Network Time, as the case may be, with an indicator of which. As the messages are sent, they are flagged as "sent" but a copy is retained in the Device's persistent memory (subject to physical limits).

Upon power resumption after a disturbance, the LAN or WAN Device restarts its clock with the value being the time it had when the disturbance began. If the Device can be fully Time Sentient (i.e. it is [RF Full]), it continues to run on its clock until Network Time is received from elsewhere in the network and coordinates therewith.

Upon power resumption after a disturbance, the LAN or WAN Device sends to the Base Station its stored unsent messages. The Base Station has intelligence to recreate the messages lost because of the power disturbance and if any are missing, it will query a Device for its "sent" messages which may have been sent but were lost on their way to the Base Station because of the power disturbance.

To address the physical limits of persistent memory, it can be organized as a circular buffer (so that older sent messages are overridden by younger sent messages) or messages may be prioritized with a triage algorithm (that deletes less critical messages to make room for more critical messages to be stored). But obviously the physical limits (i.e. amount) of persistent memory determine how many messages are stored and recoverable, regardless of the organization of the persistent memory.

Power Quality Management and Automated Meter Reading

Definitions.

A "Blink" is a power disturbance that does not extend beyond Power Outage Period. The Power Outage Period is Business-motivated but because power disturbances are measured by hardware, there is an inherent limit to the sensitivity of the hardware employed. A Blink can obviously only be recorded by a LAN Device [Battery Backup].

"AMR" is the abbreviation for "automated meter reading". "AMR Information" for a meter includes the meter serial # (or other Business-motivated indicia) plus information about the quantity of the metered energy and power consumption. Thus AMR Information Report might, for example, include the AMR Interval end time, several consumptions readings (e.g. taken at the start, mid-point and the end of the AMR Interval), Kh factor, current kWh reading). An AMR Information Report is sent at the end of the AMR Interval or upon request (by TAS or CAS messages). See AMR Parameters below for more granular explanation.

"PQM" is the abbreviation for "power quality management". "PQM Information" is information about the quality of energy and power consumption. Thus PQM Information Report might, for example, include PQM Interval end time, the And maximum voltages recorded during the PQM Interval, the average voltage recorded during the PQM Interval and several Blinks counts (e.g. at the start and end of the PQM Interval). A PQM Information Report is sent at the end of the PQM Interval or upon request (by TAS or CAS methods). See PQM Parameters below for more explanation.

PQM Parameters and AMR Parameters are used to set:
PQM Interval (a Business-motivated duration, typically in hours, with a default in the order of several hours; if zero, the device will not generate PQM Information Reports)
AMR Interval (a Business-motivated duration, typically in minutes, with a default in the order of 15 minutes; if zero, the device will not generate AMR Information Reports)
Blinks
Power Outage Period (range 1 to 10 seconds)
Voltage Sag Alarm Interval (15 seconds to 15 minutes in 15 second increments, with 0 to disable)

Voltage Sag Alarm Level (generate a Voltage Sag Alarm Message if the measured voltage remains below this level for longer than Voltage Sag Alarm Interval)

Voltage Swell Alarm Interval (15 seconds to 15 minutes in 15 second increments, with 0 to disable)

Voltage Swell Alarm Level (generate a Voltage Swell Alarm Message if the measured voltage remains above this level for longer than Voltage Swell Alarm Interval)

Voltage Swell Alarm Message includes the voltage level measured, the current time and the current Blink count Voltage Sag Alarm Message includes the voltage level measured, the current time and the current Blink count Delayed Power Outage Notification Delay (1 to 60 seconds, with 0 to disable).

PQM Parameters and AMR Parameters are Business-motivated and thus are initially set and subsequently manipulable with commands (e.g. AMR Interval Synchronize Command, PQM Interval Synchronize Command, etc.). In particular, they can be adjusted and disabled to reduce network traffic congestion, for example, as desired (as indicated above in the defaults for disabling above).

PQM and AMR Parameters for each Network Device, can be manipulated by the Base Station (through either by Traditional Addressing on a Device by Device basis, or by Contextual Addressing) or by handhelds (interacting with each subject Devices directly in the field). Of course, the exception is a LAN Device [RF Deaf], where handheld programming is necessary obviously.

Report Time of Outage Upon Power Resumption (for Non-Battery Backup Versions)

Delayed Power Outage start and power resumption times are reported to the Base Station by all LAN Device [RF Deaf] and LAN Device [RF Full, non-Battery Backup].

When power resumption is experienced by a LAN Device [non-Battery Backup], it will send to the Base Station, a message containing the time when the power disturbance started and when power resumed. Sending of this message will be delayed by a (Business-motivated) period, such that successive Blinks experienced by a LAN Device [non-Battery Backup] will not swamp the network with power resumption messages.

Voltage Sag/Swell Alarms

The LAN Device sends Voltage Swell Alarm Message and Voltage Sag Alarm Message, as the case may be, when appropriate according to the definitions above, and also appropriate restoration messages when the voltage returns to within the set range.

The AMR Interval Synchronize Command and PQM Interval Synchronize Command are used respectively to coordinate the AMR Intervals and the PQM Intervals among the LAN Devices. These commands in effect contain the times for the next AMR Interval and PQM Interval to start. Synchronization can occur across the entire network or desired portions thereof (by Contextual Address messaging) or on an individual LAN Device basis, one by one (by a unicast Traditional Message). In implementation, these Synchronize Commands contain the "base time" on which the LAN Devices are to coordinate with, for their next PQM/AMR Intervals to begin at.

A LAN Device [RF Deaf] cannot be coordinated like a LAN Device [RF Full] but its LAN Device [RF Full] [Application Custodian] can be coordinated as any other LAN Device [RF Full], and thereby, in effect, the LAN Device [RF Deaf] is indirectly coordinated.

At the end of the PQM Interval (or upon an PQM Information Report Request (TAS or CAS)), an PQM Information Report is generated and sent to the Base Station.

The AMR Configuration may include parameters such as:
a) AMR Interval
b) Power Outage reporting status (on/off to generate reports or not)
c) Power Outage Period—send a Power Outage Report (if the Outage Reporting Status is ON).

The AMR Configuration may be the subject of a Base Station query of a LAN Device or the contents of a Base Station command to a LAN Device to change.

The PQM Configuration may include parameters such as:
a) Voltage Sag Alarm Interval
b) Voltage Swell Alarm Interval
c) Voltage Sag Alarm Level.
d) Voltage Swell Alarm Level.
e) PQM Interval
f) Delayed Power Outage Notification Delay The PQM Configuration may be the subject of a Base Station query of a LAN Device or the contents of a Base Station command to a LAN Device to change.

When the LAN Device [RF Full] receives an AMR Interval Synchronize Command or a PQM Interval Synchronize Command, it will recalculate its clock "count down" value to the next PQM Information Report or AMR Information Report such that messages will be coordinated as of the time contained in the command.

Each LAN Device [RF Deaf] periodically generates a Time Synchronization Message, as explained above. When this Time Synchronization Message is received by its LAN Device [RF Full] [Application Custodian], the Time Synchronization Message is updated with the LAN Device [RF Full]'s current Network Time-stamp and routed to the Base Station. This allows the Base Station to calculate from the "time stamps" reported by any LAN Device [RF Deaf], an equivalent in Network Time.

Hybrid/Inheritance.

In a large family, not every individual is "equal" or "the same". For example, a child inherits some (but not all) attributes of the parents. For another example, a more competent parent, helps a less competent child to perform family actions. The respective analogies to this invention, might be: the addressing scheme (CAS or TAS or both) is used to approximate a station's "partial inheritance" of an upstream station's "attributes"; and a fuller functional station "helps" lesser functional stations.

The theme of creating a more cohesive family unit from a motley set of individuals, or by analogy herein, the theme of creating a more homogenized network performance from a heterogeneous network, is explained next with examples.

In realistic network implementations in the field (perhaps because of particular regulatory, economic, technological, physical or other factors), not all parts of a network have identical functionality. Some devices are "smarter" or fuller functional compared with "lesser functional" ones having a reduced feature set. The "lesser functional", relative to the "fuller functional", might have, for examples, less memory and processing capability, transmit-only instead of transceiver capability, and no battery backup.

The heterogeneous nature of realistic networks makes it difficult to achieve certain management functions. For example, if all network elements do not have functionality to be synchronized to Network Time, then it is difficult to observe accurately the status of the entire network (i.e. all elements) at a given (Business-motivated) point in time (e.g. the voltage level at all customer locations at a certain time).

Two examples of heterogeneity and this invention's attempt to "homogenize", are explained below: (1) transmit-only capability in network where other elements have transceiver capability, which affects (upstream) Time-Sentient messages and (downstream) addressing; and (2) not having battery backup in a network where other elements do, which affects the power outage reporting.

(1) Transmit-Only Capability

Two examples are provided for making "deaf" stations to "hear", as it were.

The capability of a station to "hear" affects the quality of its Time Sentience. In particular, if it is "deaf" (i.e. can only RF transmit), the aforementioned examplary difficulty of observing accurately the status of the entire network, presents itself.

A LAN Device [RF Full], having full communications transceiver functionality, can thereby learn (or be made to know by the Base Station or other Network Device), the Network Time and calculate its time in coordination therewith. Thus, in the absence of power or other disturbances to itself and to its network environment, a LAN Device [RF Full]'s Time Sentience is "full" and its internal clock's "time" is Network Time.

In contrast, a LAN Device [RF Deaf] cannot receive information from its network environment, and therefore its internal clock cannot learn (or be made to know) the Network Time and cannot calculate the passage of time in coordination therewith. The LAN Device [RF Deaf] will never know Network Time and its Time Sentience is limited in that its time will always be that of its internal clock or Relative Time.

But that does not mean that it cannot approximate a fully Time Sentient LAN Device [RF Full]. The LAN Device [RF Deaf]'s internal clock can calculate Relative Time since it last powered up and send (upstream) such Relative Time information. By providing intelligence upstream to translate its Relative Time into information coordinated with Network Time, information message from such a "deaf" Device that is Relative Time-stamped, can be approximately coordinated with Network Time. For example, the message may have the voltage measured by the LAN Device [RF Deaf] at a certain Relative Time. The upstream intelligence can be embodied in a LAN Device [RF Full] [Application Custodian] or other Network Device coordinated with Network Time.

Thus from the point of view of the remainder of the Network, that particular information coming from a "deaf" Device is coordinated with Network Time. Thus from that point of view, the apparent quality of the "deaf" Device's Time Sentience does not differ from that of a LAN Device [RF Full], although the "deaf" Device itself does not know Network Time or anything else beyond itself. Proverbially phrased, this invention asks the network to judge an individual by his actions (the value his actions create, by the work of his hands joined with others) and not by his nominal appearance.

Take the example of a Contextual Function CF that asks for an electricity consumption report for all the stations attached to power feeder line #7 at Network Time=17:00. The response for fully Time Sentient LAN Devices [RF Full] is easy to implement. Although a LAN Device [RF Deaf] cannot be precisely coordinated to Network Time, coordination can be approximated, as follows. It periodically sends to its LAN Device [RF Full] [Application Custodian], a Time Synchronization Message consisting of its then Relative Time and its Power Outage Count. A Power Outage Count is the counter kept by every Network Device in its persistent memory and its current value represents the total number of times, less one, that it has been re-powered to date (i.e. the # of Power Outages to date, less one). The LAN Device [RF Full] [Application Custodian] augments the Time Synchronization Message with its Network Time and sends the augmented message to the Base Station. This augmented message (having the LAN Device [RF Deaf]'s Relative Time with the LAN Device [RF Full]'s Network Time) allows the Base Station (or other intelligence upstream of the LAN Device [RF Deaf]) to translate the LAN Device [RF Deaf]'s Relative Time into approximate Network Time. These augmented messages are kept and the total number of times of Power-Ups, can be used as index to calculate the approximate Network Time equivalent of the LAN Device [RF Deaf]'s Relative Time-stamped information.

In this way, the LAN Device [RF Deaf] is approximated to be fully Time Sentient. It sends information to the network (and in particular, to the Base Station typically) in approximately Network Time-coordinated way as if that information were being sent by a LAN Device [RF Full].

The preceding example dealt with a TAS message being sent upstream by a "lesser" functional, LAN Device [RF Deaf].

Going the other way, although a LAN Device [RF Deaf] cannot be downstream addressed directly by a Base Station, it can be addressed "indirectly" through its LAN Device [RF Full] [Application Custodian]. The following examples deal with the Base Station addressing a LAN Device [RF Deaf] Traditionally and Contextually respectively.

One Application Custodian service is temporarily storing messages received from the LAN Devices [RF Deaf] in its Application Set, and forwarding such messages upstream upon request. Every Application Custodian knows the Traditional Addresses/Network IDs of every LAN Device it provides Application Custodian services for. In turn, the Base Station has thereby (whether knowing indirectly thereby or by keeping a master copy thereof) such information of every Application Custodian and of every LAN Device [RF Deaf]. By having the Application Custodian act as a cache or mirror for information that a Base Station TAS message would be interested in, the Base Station queries the Application Custodian that is temporarily storing a message received therefrom, to forward such information.

Turning to the CAS, because only a LAN Device [RF Full] can "hear" and react to a Contextual Function CF, the LAN Device [RF Deaf] is not, by definition, a CAS Inquisitee Station and is "orphaned" outside the CAS.

Accordingly, it is advantageous for the Business Contextual Attributes of a LAN Device [RF Full] [Application Custodian] to be "shared" or "inherited" to the extent (commercially) sensible by the LAN Devices [RF Deaf] of its Application Set. In this way, a LAN Device [RF Deaf] can be Contextually Addressed, as explained next.

For example, a LAN Device [RF Full] [Application Custodian] has the Business Contextual Attributes of "geographical area=South West" and "power feeder line=#7"). A LAN Device [RF Deaf] that is physically proximate thereto or is attached to power feeder line #7 advantageously has its Business Contextual Attributes ascribed appropriately. The LAN Device [RF Full] [Application Custodian], during Plug & Play processes, augments its Application Set information with the Contextual Attributes of its LAN Devices [RF Deaf] and thus knows which of its LAN Devices [RF Deaf] "share" (or "have inherited") which of the Application Custodian's Business Contextual Attributes.

This LAN Device [RF Deaf] does not exist in the CAS and is not addressable under TAS but may nonetheless participate in the following examplary way. In operation, the LAN Device [RF Deaf] measures its voltage levels and sends the measurements to its LAN Device [RF Full] [Application Custodian] for temporary storage. The Base Station sends a CAS message whose Contextual Function CF is "all CAS Stations whose geographical area is South West and are attached to power feeder line #7, forward your voltage levels information", in which case, the Application Custodian for that LAN Device [RF Deaf] will forward information about its voltage levels and that of its (stored) Application Set's LAN Device [RF Deaf] whose geographical area is South West and who is attached to power feeder line #7.

Just as a roll call for "all MacGregors" will elicit a response from fathers named MacGregor for themselves and for their minor sons who have inherited their father's name, a LAN Device [RF Deaf] "inherits" some of the Contextual Attributes of its environment, and in particular, those of its LAN Device [RF Full] [Application Custodian], and can be Contextually Addressed. In the above described limited way, the LAN Device [RF Deaf] can be "Contextually Addressed".

Of course, inheritance has limits, as with families of individuals, no less so with the addressing of this invention. As the respective credit ratings of father and son are independent of each other, some Contextual Attributes are, by their very nature, not sharable with others. For example, the Business Contextual Attribute of "customer credit risk rating" of a LAN Device [RF Deaf] is independent of the "customer credit risk rating" of its LAN Device [RF Full] [Application Custodian].

(2) No Battery Backup.

This example will be explained in conjunction with Power Outage Messages.

A LAN Device [Battery Backup] (whether [RF Full] or [RF Deaf]), upon suffering a Power Outage, will send a Power Outage Message to the Base Station. For a LAN Device [RF Full] [Battery Backup] (i.e. has transceiver capability to be coordinated with Network Time), its Power Outage Message will be Network Time-stamped accordingly.

For a LAN Device [RF Deaf] [Battery Backup], all its messages it sends upstream (and in particular, its Power Outage Message) will be Relative Time-stamped. In conjunction with its LAN Device [RF Full] [Application Custodian], the Base Station translates the Relative Time-stamp of the Power Outage Message, into Network Time.

In contrast to the above, a LAN Device [non-Battery Backup] requires more steps because during a power disturbance, it obviously cannot measure for a Power Outage.

When a LAN Device [non-Battery Backup] first experiences a power disturbance and if the previous Power Outage has been reported, it records in its persistent memory: (a) its Power Outage Count and (b) its time (which would be Relative Time for a LAN Device [RF Deaf], and Network Time for a LAN Device [RF Full]). This recorded information is packaged as an upstream TAS message and put in the outgoing buffer for transmission but depending on the specifics of the persistent memory, of the power disturbance, and other factors, it is not know a priori that this message will in fact be sent by the LAN Device or that if sent, it will be received by the Base Station. In any case, this message is kept in persistent memory and will be (re)sent later (upon power resumption, according to Lost Messages procedures below).

Upon power resumption, the LAN Device [RF Full] [non-Battery Backup] will increment its Power Outage Count and wait until it is re-coordinated with Network Time (it cannot be assumed that it is operating in coordination with Network Time because its upstream Devices may not yet have recovered from the power disturbance/Power Outage and would not be in a position to give Network Time to this LAN Device [RF Full] [non-Battery Backup). When it is so re-coordinated, it will send a Power Outage Message with the Power Outage Count, appropriately Network Time-stamped.

Upon power resumption, a LAN Device [RF Deaf] [non-Battery Backup] will increment its Power Outage Count (for the occurrence of the next power disturbance and possibly Power Outage), and restart its clock and send a Relative Time-stamped Power Outage Message with the Power Outage Count. The Power Outage Message(s) then still in persistent memory (sent or unsent) may be resent. The Base Station intelligence is sufficient to filter out duplicate Power Outage Message(s), if any, created by the above processes, and to recreate from the (Network and Relative) Time-stamped Power Outage messages, the state of the network (to the extent possible, according to Lost Messages procedures and other intelligence, limited only implementation technology).

Thus it is seen that, according to this invention, the "lesser functional" stations (those of the Application Set of a LAN Device [RF Full] [Application Custodian]) are (logically) associated with an upstream, fuller functional station that provides some or all of the functionality missing from the "lesser" functional stations, so that from the viewpoint of the Base Station or intermediate portions of the network, the network approximates a homogeneous network in the performance of concrete actions. By organizing and equipping stations according to this invention, the "lesser" functional stations can be made to approximate the fuller functional ones via Application Custodians, to thereby render the actions of the network more homogeneous.

Similarities Between the CAS and the Immune System.

The differences between the CAS and the body's immune system are so many and obvious that their expression is not warranted. That said, some similarities between them are worth noting to highlight the advantageous aspects of the CAS.

Unlike the nervous system (where neural signals are sent in a "connection-oriented" way), the vascular system is a "connection-less" network. Within vessels and tissue that carry or circulate fluids such as blood or lymph or sap through the body, the cells and molecules "float freely" in blood or lymph.

Antibodies are produced by the body and "sent" into the vascular system to "seek and destroy" antigens (i.e. biological substances that are "alien" to the body). An antibody is a molecule that is produced in response to an antigen and has the physical property of being able to combine or bind with the antigen that induced its production, at their respective binding sites. The epitope part of the antigen and the paratope of the antibody "recognize" each other upon "meeting" and bind to each other (to mark for destruction, to coat or to do or start a "payload"-type activity as part of the defense mechanism). The paratope of the antibody, and the epitope of the antigen that induced production of that antibody, are the respective molecular shapes or contours thereof that are mutually attractive (including physically complementary) and interact much like a lock and a key designed for that lock. An antibody and an antigen that is not related to that antibody, ignore each other, much like the "interaction" between the wrong key for a lock will be a non-event.

The complementary epitope-paratope interaction is akin to a CAS Station receiving a CAS message that it decodes and determines was meant for it. The antibodies do not know in advance where an antigen is in the body, in the same way that the CAS Inquisitor Station does not know "where" its sought Stations are.

The binding is done as a function of electrical charge attractions—the more the 3-dimensional shapes of epitope and paratope are complementary, the greater the attraction between antigen and antibody Of course, information technology's digital equivalent of that complementary binding, is more definite—complementary is binary and opposite, so that "11101" binds to "00010", for analogous example.

An antigen's immunogenicity is its ability to induce a specific immune response. The greater the chemical complexity (i.e. the more epitope diversity, the higher degree of immunogenicity). Similarly, the larger the number of Contextual Attributes a CAS Station has for consideration, the more enriched the network is.

Endocrine glands secrete hormones. Because there is no direct connection between the glands and the target tissues and there is usually some distance therebetween, endocrine glands are often called "ductless". Once secreted, the hormones find their way and identify the target tissues by themselves, without assistance from the gland. Similarly, the CAS Inquisitor Station does not know "where" the sought CAS Inquisitee Stations are—it just sends out a CAS message.

Thus it is seen that some body systems do not know, at least initially, "where" the target is but are very sensitive to "who" (i.e. very sensitive to "alien" substances).

The similarities between the body's immune and hormonal system, designing drugs to target specific 3-D receptors, and more generally, chemo-communications between organisms, are by crude analogy only. Such biological analogies are obviously not prior art for this invention but illuminate obliquely, some of its themes and advantages.

It is interesting to observe that that the human body has both nervous and vascular systems (connectionless and connection oriented) working side by side, and that the preferred embodiment also has both a "connection-oriented system" (the communications network operating with TAS for some messages, where the source knows "where" to send) and a "connection-less system" (the communications network operating with CAS for other messages, where the person who wants to know doesn't know "where" the others of interest to him, are). The preferred embodiment advantageously combines "who?" and "where?" in one system.

Some of the communication proxies mentioned above can "piggy back" on existing landline and cellular systems employed by the business. The choice depends on the examplary factors of (existing and desired) communications coverage, cost, control and capacity.

Although the physical medium of communications in the preferred embodiment was wireless, of course wire or optical medium are possible. For example, although a sensor and an effector were defined in terms of electric signals, an obvious equivalent would be optical signals. For example, messages according to this invention, can be modulated and carried over the power lines (e.g. power line carrier technologies from Hunt Technologies, Inc. and Distribution Control Systems, Inc., with representative patent disclosures of U.S. Pat. Nos. 5,262,755, 5,5581,229, 6,154,488 and 6,177,884 and US publication #2003/0006884). Other embodiments of this invention can be carried out through the cable television system, for example, and the term "RF broadcast" herein is not to be understood as some regulatory regimes may peculiarly define for policy reasons (in which "broadcast" does not include point-to-multipoint transmission, for example, under FCC Parts 73 and 74).

As explained in the preferred embodiment, some processes (such as Plug & Play) use Traditional Addressing Scheme. But it is not necessary in other embodiments. A CAS network can be established through Plug & Play without Traditional Addressing for the new element to communicate with the Base Station.

CAS was described in the preferred embodiment as a downstream addressing scheme, radiating from a Base Station. There is no restriction of the CAS to downstream addressing. CAS can be used for upstream addressing (in part or in whole), as suggested by FIG. 3, where several CAS networks can co-exist as subsets of the communications system engaging the Interface Modules, each with its CAS Inquisitor Station and semantical scheme shared with its Inquisitee Stations (e.g. its Contextual Variables and operating RF frequency).

The preferred embodiment related primarily to electric utilities telemetry. This invention applies advantageously to other utilities telemetry businesses (such as gas and water utilities) and to many non-utilities situations. Examplary sensory Interaction Modules include building security and environmental alarms, sensors (e.g. for monitoring equipment and inventory in a warehouse setting, the level of water in a dyke system, the temperature of a road or the number of items sold or remaining in a vending machine), accelerometers, pressure transducers and strain gauges. Examplary effectory Interaction Modules include actuators on a robotic factory assembly line, thermostats, gauges and valves (e.g. for pressurized containers). Other operating environments are those of the office, home and business. For example, in an office network of printers, fax machines and other office equipment, the sensors measure the level of paper or other consumable, the date of the last maintenance overhaul, and the effectors can terminate access or power, and a desired complex action is "all equipment that has not undergone a maintenance check for a 100 days or 1000 prints, whichever happens first, please shut down". In the home setting, appliances (e.g. freezers, heaters) can be coordinated with this invention. In the warehouse or factory, this invention can advantageously be used to interact with HVAC systems, lighting systems, motors, break mechanism, pumps, etc.

In the preferred embodiment, reception of all (downstream and upstream) Traditionally Addressed messages is acknowledged on a packet by packet basis, by a conventional process not explained herein for economy of expression. Obviously, (direct or indirect) acknowledgement can be accomplished on a different basis (e.g. higher than at the packet level). Also, acknowledgement in the preferred embodiment was mentioned only in respect of TAS messages, for economy of explanation.

The wireless LAN, as suggested in the preferred embodiment above, can be implemented as narrow band 433 MHz. Of course, other implementations are possible. A spread spectrum, frequency hopping technology implemented in its band of LAN Communication Channels at 900 Mhz, is possible, for example. Of course, depending on the implementation choice, certain features need to be redesigned and will require conventional modification to reflect where the intelligence and processing power is distributed in the network, as a matter of design by those skilled in the art.

As mentioned above, the topology of a CAS network does not have to be stable. For example, the network can operate on mobile Internet Protocol (for trains moving in a trainyard or a fleet of courier trucks, for examples).

As indicated above in the preferred embodiment, all (downstream and upstream) messages are Traditionally Addressed except those downstream messages from the Base Station which are Contextually Addressed. This arrangement of communications addressing schemes is reflected by the company meeting analogy and the respective roles of chairperson and audience. The "chairperson→audience" relationship is akin to the downstream aspects of a Base Station-endpoints communications network. During the course of the meeting, the chairperson may recognize and communicate with a particular attendee or may address the entire audience. The "chairperson←audience" relationship is akin to the upstream aspects of the network. Official communication by an attendee is normally addressed to the chairperson and not directly to other attendees. That said, there is no inherent reason why an upstream message cannot be a CAS message. But for economy of explanation and expression in the preferred embodiment, the CAS is a downstream addressing scheme.

Although the preferred embodiment as been described with the combination of both Traditional Addressing Scheme and Contextual Addressing Scheme, as indicated above, each can be the only addressing scheme in a network being employed by the inventive processes (for example, Plug & Play processes based purely on CAS).

Although the preferred embodiment concentrated on assisting the Base Station to achieve a desired complex action through effective engagements of the Interaction Modules for interacting with the operating environment, obviously an examplary desired complex action is the reporting of conditions of sensor-Interface Modules on an event-driven basis (e.g. alarm condition) rather than being managed by the Base Station (in the examplary PQM and AMR reporting processes).

In the preferred embodiment, all Network Devices had transmission communications functionality. In principle, a Network Device could have only reception communications functionality.

The WAN Devices were considered in the preferred embodiment as communication proxies between the Base Station and the LAN. Of course, they can be equipped with extra functionality (e.g. to be also an ultimate recipient or sources of data, like the LAN Devices).

A WAN Device by itself (i.e. without an Interaction Module) does not make sense in the preferred embodiment because it is meant to be a communication proxy therein. In the preferred embodiment, the field installer begins with an un-associated WAN Device that has an attached LAN Device [RF Full], i.e. each new WAN Device is deployed as part of a WAN/LAN Device (see aforementioned U.S. application Ser. No. 10/164,394). In other embodiments (not explained herein for economy of explanation), an un-associated WAN Device could have attached, other types of Network Devices, such as LAN Device [RF Deaf], LAN Device [RF Deaf and Dumb], a remote power disconnect switch, a SCADA/DNP modem, keypad and any other device useful for a desired complex action.

In the preferred embodiment, there was a one-to-one relationship between a LAN Device and an Interaction Module, for simplicity of explanation and expression. In principle, there could be other types of relationships, e.g. a LAN Device with multiple Interaction Modules.

For the preferred embodiment and its CAS network, the examplary station that was "deaf" to a CAS message was the LAN Device [RF Deaf]. But in its generality, a station is "deaf" for CAS purposes if it cannot process the currently pending CAS message, without restricting to any particular basis of "deafness". A LAN Device may have RF transceiver capability but still be "deaf" to a CAS message because the CAS message was formed with a communications protocol that differs from the one it can understand (to return to the United Nations analogy, the individuals are all "hearing" individuals but they do not all speak the same dialect). In its generality, "deafness" for CAS purposes can be made "contextual" and is not restricted to having "no ears" of the [RF Deaf].

The use of beacons in the Plug & Play of the preferred embodiment has obvious alternatives to those skilled in the art (e.g. polling). Different alternatives have different advantages and disadvantages for different aspects of network performance, all within the purview of those skilled in the art.

There is no mention herein to peer-to-peer communications (e.g. communications among LAN Devices) to avoid cluttering the economy and simplicity of explanation for the Base Station-centric network. Many of the principles of this invention explained above, are readily applicable to peer-to-peer communications, with appropriate modifications easily made by those in the art. For an obvious example, concepts of "downstream" and "upstream" would obviously be (at least partially) inapplicable and accordingly, the message format for a peer-to-peer message would be similar to that of the Traditionally Addressed Message (see FIG. 1) except that addresses for both peer source and peer destination must be provided. Also, "convergence points" where a LAN Device [RF Full] keeping track of Routing Sets, can be used so that every peer need not keep track of the TAS address of every other peer.

Although this invention has been described in connection with the preferred and other embodiment, it is not intended to be limited thereto, but on the contrary, it is intended to cover such alternatives, modifications, and equivalents, as can be reasonably included within the spirit and scope of the invention as defined by the claims. Also, although analogies have been used in the preceding descriptions, they are not to be pressed unreasonably far, beyond the point where they cease to be helpful in illuminating certain aspects of the inventive concepts.

We claim:

1. For a network of stations having a Base Station, wherein each station sends messages to the Base Station and the sending of a message requires power, and each station is provided with power and each station has a clock and persistent memory and wherein the Base Station maintains a network time for the network stations to coordinate with, a method of recovering the state of the network stations upon the occurrence of a disturbance of that power and a resumption after the power disturbance, comprising the steps of:
    each station, while powered,
        (a) keeps in said memory, a copy of each message after said message is sent;
        (b) indicates on said message copy the status as said message is being sent;
        (c) stores time-stamps, based on each station's clock, with each said message copy indicating a time of sending;
        (d) upon the occurrence of the power disturbance and then the power resumption, sending to the Base Station, each said time-stamped message copies; and the Base Station re-assembling the messages in chronological order based on said message copies; and wherein said clock re-starts at the time said clock had upon the power disturbance and continues until said clock is able to be coordinated with the network time.

2. The method of claim 1, wherein said clock is coordinated with network time.

3. The method of claim 2, wherein, during the process of re-assembling, if the Base Station deduces that a message is missing, querying the relevant station to resend the missing sent message.

4. The method of claim 3, wherein said step of keeping in said memory is organized in the form of a circular buffer wherein the oldest message is overwritten by the most recent message sent.

* * * * *